(12) United States Patent
Horie

(10) Patent No.: US 9,284,072 B2
(45) Date of Patent: Mar. 15, 2016

(54) COUPLING/UNCOUPLING MECHANISM AND COSMONAUTIC VEHICLE COMPRISING THE SAME

(75) Inventor: Youichi Horie, Mino (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 335 days.

(21) Appl. No.: 13/976,690

(22) PCT Filed: Dec. 16, 2011

(86) PCT No.: PCT/JP2011/007036
§ 371 (c)(1),
(2), (4) Date: Jul. 11, 2013

(87) PCT Pub. No.: WO2012/090419
PCT Pub. Date: Jul. 5, 2012

(65) Prior Publication Data
US 2013/0294827 A1    Nov. 7, 2013

(30) Foreign Application Priority Data
Dec. 27, 2010    (JP) ................ 2010-289110

(51) Int. Cl.
| | | |
|---|---|---|
| *B25G 3/20* | (2006.01) | |
| *F16B 2/14* | (2006.01) | |
| *F16B 2/18* | (2006.01) | |
| *F16B 7/04* | (2006.01) | |
| *B64G 1/64* | (2006.01) | |
| *F16B 21/06* | (2006.01) | |

(52) U.S. Cl.
CPC ........ *B64G 1/641* (2013.01); *B64G 1/64* (2013.01); *B64G 1/645* (2013.01); *F16B 21/065* (2013.01); *Y10T 403/7071* (2015.01); *Y10T 403/7075* (2015.01)

(58) Field of Classification Search
CPC .......... B64G 1/64; B64G 1/641; B64G 1/645; E05C 19/10; E05C 19/14; E05B 83/247; Y10T 24/454611; Y10T 24/45466; Y10T 403/21; Y10T 403/217; F16B 1/004; F16B 2001/0078
USPC .......... 403/321, 321.1, 322.4, 324–326, 330, 403/341, 345, 374.5, 376; 292/95, 110, 292/113, 116, 117, 118, 97, 100
See application file for complete search history.

(56) References Cited

U.S. PATENT DOCUMENTS 3,888,526 A * 6/1975 Dennis ........................... 292/97
4,003,614 A * 1/1977 Geer et al. .................. 312/332.1
(Continued)

FOREIGN PATENT DOCUMENTS

| JP | A-2006-290065 | 10/2006 |
|---|---|---|
| JP | B2-82-3922718 | 5/2007 |
| WO | WO 01/02248 A1 | 1/2001 |

OTHER PUBLICATIONS

Mar. 13, 2012 International Search Report issued in International Application No. PCT/JP2011/007036.

*Primary Examiner* — Gregory Binda
*Assistant Examiner* — Nahid Amiri
(74) *Attorney, Agent, or Firm* — Oliff PLC

(57) ABSTRACT

A coupling/uncoupling mechanism maintains, when a male coupling body is coupled to a female coupling body, a condition that the male coupling body is inserted in an insertion space and the other end of a lever member is in a position in proximity to the insertion space, so that an engaging surface of an engaging member is contacted with an engageable surface of the male coupling body. When the male coupling body and the female coupling body are uncoupled, the other end of the lever member moves to a direction to be apart from the insertion space, so that the engaging surface moves toward a withdrawing direction. This allows releasing the contacting of the engaging surface with the engageable surface. This provides that sufficient fastening force can be achieved with a simple configuration and the coupling status can be retained with a smaller force as compared with such a fastening force, and further, a recombination can be easily achieved even after a separation is made.

15 Claims, 11 Drawing Sheets

(56) References Cited

U.S. PATENT DOCUMENTS

| | | | | |
|---|---|---|---|---|
| 4,318,557 A | * | 3/1982 | Bourne et al. | 292/113 |
| 5,400,987 A | * | 3/1995 | Ziavras | 244/172.6 |
| 5,435,615 A | * | 7/1995 | Schmitz | 296/121 |
| 7,162,182 B2 | * | 1/2007 | Tonges et al. | 399/110 |
| 7,596,341 B2 | * | 9/2009 | Yokoi | 399/124 |
| 8,521,064 B2 | * | 8/2013 | Yamauchi | 399/121 |

* cited by examiner

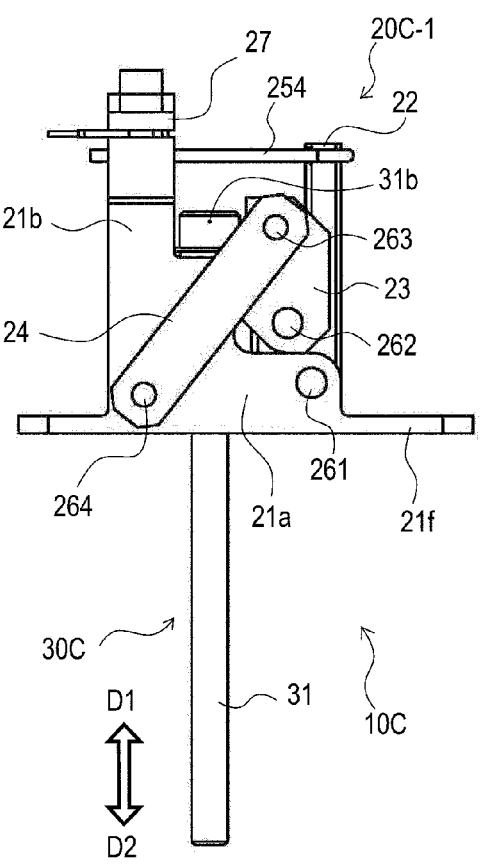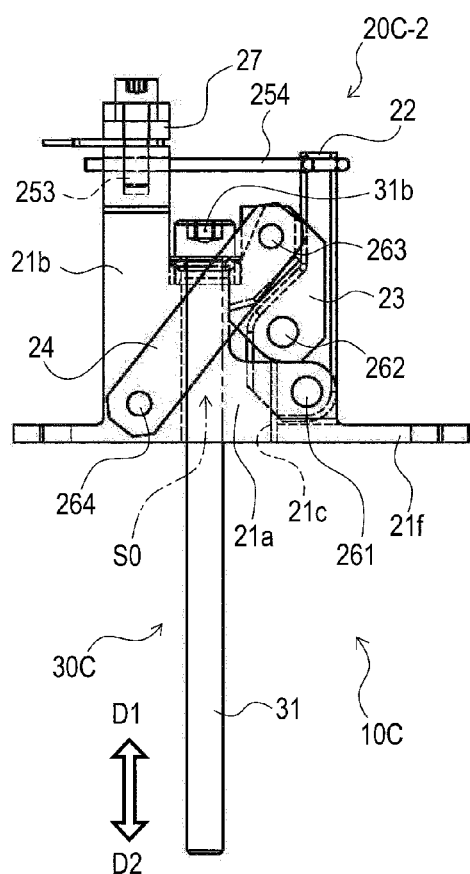

COUPLING/UNCOUPLING MECHANISM AND COSMONAUTIC VEHICLE COMPRISING THE SAME

TECHNICAL FIELD

The present invention relates to a coupling/uncoupling mechanism, which is capable of coupling two coupling bodies and maintaining thereof in a separable manner, and a cosmonautic vehicle comprising the aforementioned coupling/uncoupling mechanism, and particularly relates to a coupling/uncoupling mechanism, which is capable of providing further reduced force for maintaining the coupling status (coupling-maintaining force) as compared with force for coupling the coupling bodies (fastening force), and a cosmonautic vehicle comprising the aforementioned coupling/uncoupling mechanism.

BACKGROUND ART

Various types of structures for coupling two coupling bodies and maintaining thereof in a separable manner (coupling/uncoupling structures), which are employed in various types of applications from the field of daily life to the field of advanced technologies and have structures suitable for the applications, are proposed.

When the field of the cosmonautic vehicle is exemplified as an example for the field of advanced technology, a coupling/uncoupling structure is employed in order to separate two connected cosmonautic vehicles. For example, Patent Literature 1 discloses an uncoupling mechanism for connecting an artificial satellite and a rocket as cosmonautic vehicles in a separable manner, and a coupling/uncoupling structure is contained in the aforementioned uncoupling mechanism.

The aforementioned uncoupling mechanism comprises flange sections, which are provided in each of a coupling end of a rocket main frame (a rocket main body) and a coupling end of an artificial satellite, a fitting member, which is fitted to the aforementioned flange section from the outside thereof in the state that these flange sections are mutually coupled, and a band member wound and turned around the outer circumference of the coupling section containing the aforementioned fitting member (for example, Marman clamp band). The both ends of the band member are coupled to each other by a coupling member composed of a bolt or the like in the state that the outer circumference of the fitting member is tightened, and a breaking device is mounted in the aforementioned coupling member. The coupling member is broken with the breaking device on the occasion of the separation of the artificial satellite, and thus the coupling between the end sections of the band member is released, so that the artificial satellite would be separated from the rocket main frame. The aforementioned coupling member and the disconnecting device correspond to the above-described coupling/uncoupling structure.

An explosive bolt or a pyrotechnic fastener is generally employed for the coupling/uncoupling structure of the aforementioned configuration. Typical explosive bolt is configured to include an explosive provided in an axis core of a bolt, and the explosive is exploded to break the bolt when the artificial satellite is separated, thereby releasing the coupling of the band member.

Meanwhile, large-scale artificial satellites are in the practical use in recent years, and the fight speed of the rockets that is coupled with the artificial satellite is tended to be increased. When the size of the cosmonautic vehicle is increased and the flight speed thereof is increased as described above, it is necessary to sufficiently tighten the coupling section between the cosmonautic vehicles by the band member. Hence, larger fastening force would be required for the coupling/uncoupling structure for coupling the band member.

In the case of composing the coupling/uncoupling structure with the aforementioned explosive bolt, when sufficient fastening force cannot be achieved with a single explosive bolt, a plurality of explosive bolts may be employed. However, since the coupling of the band member with the explosive bolt is created in the state of tightening the aforementioned band member, the use of a plurality of explosive bolts deteriorates the workability for the coupling. Also, all of plurality of explosive bolts must be firmly and entirely broken in order to appropriately separate the cosmonautic vehicle off, and therefore it is necessary to increase the explosive force of the explosive and it is also necessary to enhance the reliability for the ignition of the explosive. Consequently, the explosive bolt may be possibly an expensive product, and in addition, larger bombardment is generated by the explosive force in the breaking of the explosive bolt to possibly cause an impact on the cosmonautic vehicle.

Thus, conventionally, a coupling/uncoupling structure without employing the pyrotechnic composition such as the explosive bolt and the like is proposed. For example, Patent Literature 2 proposes a coupling/uncoupling device configured to comprise trapezoid tooth profile sections provided in an end section of a band member and configured to mutually engage between the inner surface and the outer surface thereof, a cam body for pressing the aforementioned trapezoid tooth profile section and an actuator for actuating the cam body. In this configuration, the band member is opened by driving the actuator to actuate the cam body, and thus when the pressing condition for the band is released, the band is opened, resulting in that the trapezoid tooth profiles of the other end are mutually separated.

Also, Patent Literature 3 discloses a band opening mechanism as an example of a coupling/uncoupling structure utilizing a release mechanism comprising pins, and valve needles. The valve needle serves as closing a duct that connects an annular chamber filled with a viscous substance (lead) therein and an empty chamber. The annular chamber is formed between a housing and a piston, which are fitted to each other, and the empty chamber is formed in a cap on the piston. When the aforementioned release mechanism is actuated, the pin displaces the position of the valve needle, so that the viscous substance transfers from the annular chamber to the through the duct. This causes the piston continually moving from the housing, so that the band member is opened at a predetermined time that is previously defined.

According to Patent Literature 2 or 3, it is disclosed or suggested that larger fastening force can be achieved without a need for larger force for releasing the coupling of the band member and in the state that the band member is coupled by employing the coupling/uncoupling structures disclosed in these Patent Literatures.

CITATION LIST

Patent Literature

Patent Literature 1: Japanese Patent No. 3922718
Patent Literature 2: Japanese Laid-Open Patent Application Publication No. 2006-290065
Patent Literature 3: WO 01/02248 pamphlet

SUMMARY OF INVENTION

Technical Problem

However, the configuration of the coupling/uncoupling structure disclosed in Patent Literature 2 or 3 is very complicated, although none of the pyrotechnic composition such as the explosive bolt and the like is employed, and in addition, re-coupling of the band member after the separation is impossible, or the operation of the re-coupling is onerous.

For example, since the coupling/uncoupling structure disclosed in Patent Literature 2 employs the trapezoid tooth profile section configured to mutually engage between the inner surface and the outer surface thereof for the coupling of a plurality of band members, the engagement of the trapezoid tooth profile section can be easily released by actuating the cam body to open the band member. On the other hand, re-coupling of a plurality of band members requires tightening with larger force and engaging both trapezoid tooth profile sections, and therefore the operation of the re-coupling is considerably onerous.

Also, the coupling/uncoupling structure disclosed in Patent Literature 3 focuses on the release of the tensile force of the band member with a timed process, and thus a unique mechanism for transferring the viscous substance (lead) between the chambers through the duct in order to open the band member is employed. If the re-coupling of the band member is intended, an operation for returning the viscous substance to the original chamber is necessary, so that it is estimated that only the one-way use is available. While Patent Literature 3 also discloses other configurations, most of other configurations are for the one-way use.

If the band member, which has been once opened, can be easily re-coupled, tests of the coupling and uncoupling for the purposes of quality control, reproducibility, confirmation of function and the like of the coupling/uncoupling structure can be conducted. Hence, reliability of the coupling/uncoupling structure can be improved, and further, reliability of the uncoupling mechanism for the cosmonautic vehicle comprising the aforementioned coupling/uncoupling structure can also be improved.

The present invention is made in order to solve such a problem, and it is an object of the present invention to provide a coupling/uncoupling mechanism, in which sufficient fastening force can be achieved with a simple configuration and the coupling status can be retained with a smaller force as compared with such a fastening force, and further, a recombination can be easily achieved even after a separation is made.

Solution to Problem

In order to solve the above-described problems, a coupling/uncoupling mechanism, employed for coupling and uncoupling two couple-able sections to and from each other, comprises a bar-shaped male coupling body and a female coupling body having an insertion space for inserting and withdrawing the male coupling body, wherein said male coupling body has an engageable surface, which intersects a lengthwise direction thereof and faces a withdrawing direction, wherein said female coupling body comprises: a support member having a shape for supporting a state in which said male coupling body is inserted in said insertion space; a lever member, provided in a position facing said insertion space, and having one end and the other end, said one end being connected to said support member by a lever support-coupling section, said other end being configured to be movable in a direction toward a side opposing to said insertion space by the lever support-coupling section; an engaging member, rotatably connected at one end thereof to a position between both ends of said lever member via a lever rotation-coupling section, and having an engaging surface, which is contacted with said engageable surface of said male coupling body from the withdrawing direction; and a link member, rotatably connected at one end thereof to the other end of said engaging member via a link rotation-coupling section positioned away from said lever rotation-coupling section and in proximity to said engaging surface, in an inserting direction, and rotatably connected at the other end thereof to said support member via a link support-coupling section, wherein, when said male coupling body is coupled to said female coupling body, said male coupling body is inserted in the insertion space, the other end of said lever member is disposed in a position in proximity to said insertion space, and a condition in which said engaging surface of said engaging member is contacted with said engageable surface of said male coupling body is maintained, and wherein, when said male coupling body and said female coupling body are uncoupled, the other end of said lever member moves along a direction of being apart from said insertion space so that said engaging surface of said engaging member moves toward a withdrawing direction, resulting in releasing the contacting between said engaging surface and said engageable surface of said male coupling body.

In the aforementioned configuration, it may be configured that, when said male coupling body is coupled to said female coupling body, said lever support-coupling section and said link rotation-coupling section are arranged in this sequence along a direction from said lever member toward said insertion space; said lever rotation-coupling section is disposed in the withdrawing direction with respect to said link rotation-coupling section, and said link support-coupling section is positioned such that said insertion space is interposed between said link rotation-coupling section and said link support-coupling section.

In the aforementioned configuration, it may also be configured that the coupling/uncoupling mechanism further comprises a lever-fixing member for releasably fixing the lever member to said support member so as to disturb a movement of the other end of said lever member.

In the aforementioned configuration, it may also be configured that said support member includes a support front section, which constitutes a front section of said female coupling body and has an opening for inserting and withdrawing said male coupling body in and from said insertion space, and a support side section, which constitutes a section facing said lever member, and wherein said lever-fixing member is a pin member or a string-type member for connecting an end section of said support side section in the side of the inserting direction to the other end of said lever member.

In the aforementioned configuration, it may also be configured that an insertion hole for inserting one end of said pin member or said string-type member is provided in said end section of said support side section or in the other end of said lever member, and an insertion hole-heating unit provided in a position adjacent to the insertion hole and for heating the interior of the insertion hole is further provided, and wherein, when said male coupling body is coupled to the female coupling body, said end section of said support side section is connected to the other end of said lever member by blocking the insertion hole with a thermoplastic material, after one end of said pin member or string-type member is inserted in said insertion hole.

Alternatively, a coupling/uncoupling mechanism according to the present invention comprises, in order to solve the above-described problems, a coupling/uncoupling mechanism, employed for coupling and uncoupling two couple-able sections to and from each other, comprising a bar-shaped male coupling body and a female coupling body having an insertion space for inserting and withdrawing the male coupling body, wherein said female coupling body comprises: a support member having a support side section, which is in parallel with the insertion space so as to support a state in which said male coupling body is inserted in said insertion space; a lever member, provided in a position facing said support side section to form said insertion space interposed therebetween, and having one end and the other end, said one end being connected to said support member, said other end being configured to be movable in a direction toward a side opposing to said insertion space by the lever support-coupling section; and a lever-fixing member for providing fixing so as to prevent the other end of said lever member from being moved to the outside by connecting the other end of said lever member with said support side section at the both ends, wherein an insertion hole for inserting one end of said lever-fixing member is further provided in said support side section or the other end of said lever member, and an insertion hole-heating unit disposed in a position adjacent to the insertion hole, for heating the interior of the insertion hole, is further provided, and wherein, when said male coupling body is coupled to the female coupling body, said end section of said support side section is connected to the other end of said lever member by blocking the insertion hole with a thermoplastic material, after one end of said lever-fixing member is inserted in said insertion hole.

In the aforementioned configuration, it may also be configured that said lever-fixing member has a main frame, which is bar-shaped or string-shaped, and wherein, when said male coupling body is coupled to the female coupling body, the other end of said lever-fixing member is mechanically fixed to one without being provided with said insertion hole selected from said support side section and the other end of said lever member.

In any of the aforementioned coupling/uncoupling mechanisms, said male coupling body and said female coupling body may be configured to be coupled or uncoupled for opening or closing the ring of the strip-shaped band member.

In the aforementioned configuration, an exemplary implementation may be exemplified, in which said band member is a Marman clamp band for fixing a second cosmonautic vehicle to a first cosmonautic vehicle, and also an exemplary implementation may be additionally exemplified, in which said first cosmonautic vehicle is a rocket main frame, and said second cosmonautic vehicle is an artificial satellite.

Hence, the present invention also includes cosmonautic vehicles comprising the coupling/uncoupling mechanism of the aforementioned configuration, in addition to the coupling/uncoupling mechanisms of the aforementioned configurations.

The above-described objects and other objects, features and advantages of the present invention will be more apparent from the following description of certain preferred embodiments taken in conjunction with the accompanying drawings.

Advantageous Effects of Invention

As described above, according to the present invention, it achieves an advantageous effect that provides a coupling/uncoupling mechanism, in which sufficient fastening force can be achieved with a simple configuration and the coupling status can be retained with a smaller force as compared with such a fastening force, and further, a recombination can be easily achieved even after a separation is made.

BRIEF DESCRIPTION OF DRAWINGS

FIG. 10A is a plan view, showing an example of a configuration of a single female type coupling body and male coupling body in the coupling/uncoupling mechanism shown in FIG. 9, FIG. 10B is a schematic perspective drawing, showing an example of an interior configuration of the coupling/uncoupling mechanism shown in FIG. 10A.

DESCRIPTION OF EMBODIMENTS

Figure 1A:
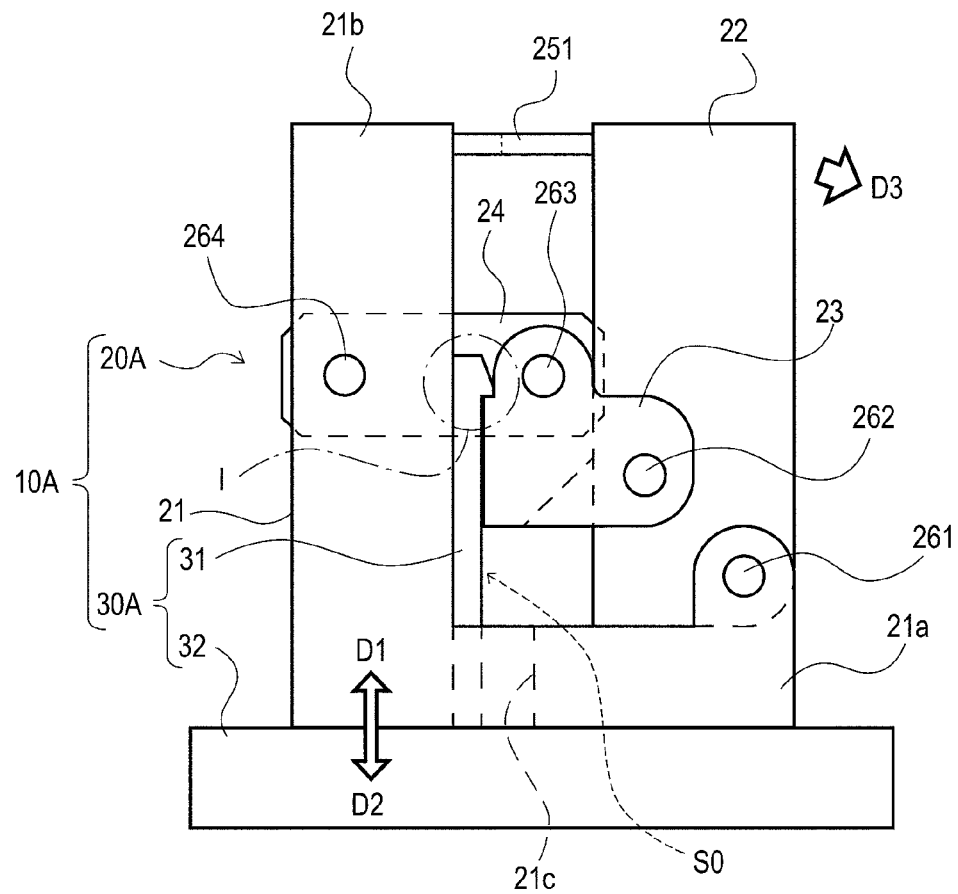
FIG. 1A is a schematic plan view, showing a configuration of a coupling/uncoupling mechanism according to Embodiment 1 of the present invention.

Hereinafter, preferable Embodiments of the present invention will be described in reference to the annexed figures. Hereinafter, same reference numeral is assigned to same or corresponding element in all figures, and the duplicated description is not given.

Embodiment 1

Configuration of Coupling/Uncoupling Mechanism

Figure 1B:
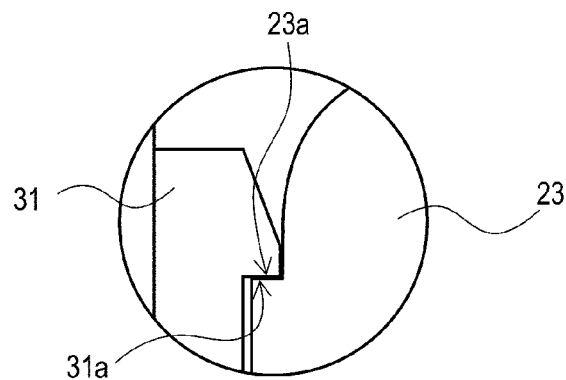
FIG. 1B is an enlarged view of a region I indicated by an alternate-long-and-short dash line in the coupling/uncoupling mechanism shown in FIG. 1A.
Figure 2A:
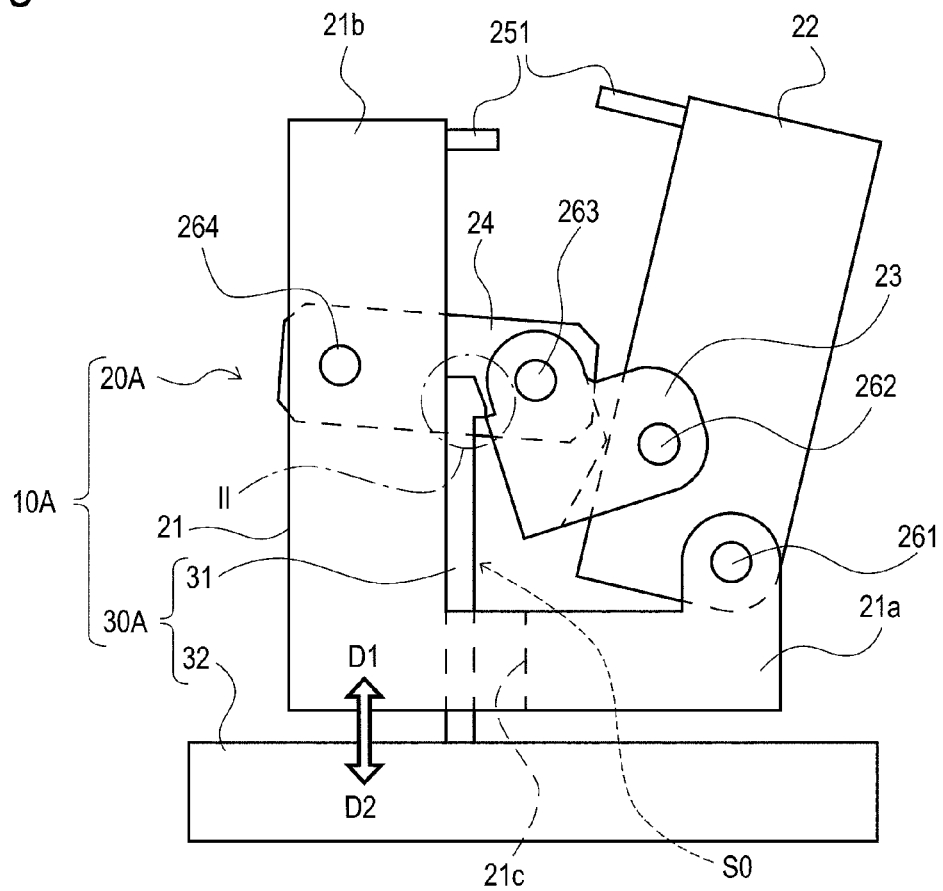
FIG. 2A is a schematic plan view, showing a configuration when the coupling body constituting the coupling/uncoupling mechanism shown in FIG. 1 is separated.

First of all, a configuration of a coupling/uncoupling mechanism according to Embodiment 1 of the present invention will be specifically described in reference to FIG. 1A, FIG. 1B and FIG. 2A. As shown in FIG. 1A, a coupling/uncoupling mechanism 10A according to the present embodiment is composed of a female coupling body 20A and a male coupling body 30A. The female coupling body 20A is composed of a support member 21, a lever member 22, an engaging member 23, a link member 24, and a fixing pin member 251. The male coupling body 30A is composed of a coupling body-main frame 31 and a main frame-support section 32.

The female coupling body 20A includes a space for inserting and withdrawing the male coupling body 30A (insertion space), and the male coupling body 30A is configured to be inserted in the aforementioned insertion space of the female coupling body 20A and to be withdrawn from the insertion space of the female coupling body 20A. As shown in FIG. 1A, the male coupling body 30A and the female coupling body 20A are coupled to each other in the state that the male coupling body 30A is inserted, and, as shown in FIG. 2A, are separated from each other by withdrawing the male coupling body 30A from the female coupling body 20A. In FIG. 1A and FIG. 2A, the inserting direction is defined as the direction toward the D1 side of a bi-direction bold arrow in FIGS. 1A and 2A (toward the upper side in FIGS. 1A and 2A), and the withdrawing direction is defined as the direction toward the D2 side (toward the lower side in FIGS. 1A and 2A).

In the present embodiment, an insertion space S0 (broken line arrow in FIGS. 1A and 2A) is formed between the support member 21 and the lever member 22. The support member 21 is composed of a support front section 21a for constituting a front section of the female coupling body 20A and having an insertion aperture 21c for inserting and withdrawing the male coupling body 30A in and from the insertion space S0, and a support side section 21b constituting a section facing the lever member 22. More specifically, in the configuration shown in FIG. 1A, the lower side in FIG. 1A forms the front side of the female coupling body 20A, and the upper side in FIG. 1A forms the rear side of the female coupling body 20A.

The male coupling body 30A is composed of the coupling body-main frame 31 for being inserted in the insertion space S0 of the female coupling body 20A and the main frame-support section 32 for supporting the aforementioned coupling body-main frame 31 in the present embodiment. The specific configuration of the main frame-support section 32 is not particularly limited, and it is sufficient to have a shape, to which a portion of a couple-able member (couple-able section) can be fixed, and various shapes may be adopted depending on the using conditions of the coupling/uncoupling mechanism 10A (type of the couple-able member, configuration of a part of the couple-able member, the coupling status or the environment of the uncoupling, and the like), and further, none of this may be employed depending on the condition. More specifically, this may have a configuration that the coupling body-main frame 31 is fixed directly to a portion of the couple-able member. Here, in the exemplary implementation shown in FIG. 1A and FIG. 2A, the main frame-support section 32 is illustrated as a substantially plate-shaped or substantially column-shaped member that extends in a direction perpendicular to the lengthwise direction of the coupling body-main frame 31, for the purpose of the convenience in the description.

Figure 2B:
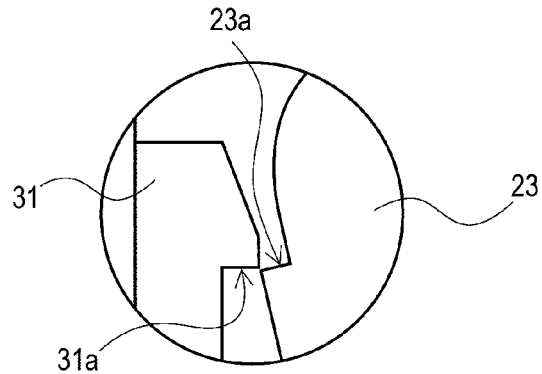
FIG. 2B is an enlarged view of a region II indicated by an alternate-long-and-short dash line in the coupling/uncoupling mechanism shown in FIG. 2A.

The coupling body-main frame 31 is substantially bar-shaped as shown in FIG. 1A and FIG. 2A, and has an engageable surface 31a, which intersects the lengthwise direction thereof is opposed to the withdrawing direction D2, as shown in FIG. 1B and FIG. 2B. In the state that the coupling body-main frame 31 (male coupling body 30A) is inserted in the female coupling body 20A to be coupled thereto, the engageable surface 31a is contacted with the engaging member 23 of the female coupling body 20A as shown in FIG. 1B. This status will be discussed later. Here, FIG. 1B is an enlarged view of the region I in FIG. 1A.

The specific shape of the coupling body-main frame 31 is not particularly limited to any specific shape, as long as this is a bar-shape and has an engageable surface 31a, and more specifically, may be a cylindrical shape, a prism shape, a long and narrow plate-like shape, or a shape except the shape of the engageable surface 31a and having an irregularity or a step. Also, while the surface to be engageable surface 31a is constituted by a flat surface having a direction perpendicular to the longitudinal direction in vicinity of the leading end of the coupling body-main frame 31 in the present embodiment, this is not limited to this configuration, and this may be configured to be inclined in the lengthwise direction in vicinity of the leading end like a "barb" of a fishhook, or may be constituted by a curved surface and not of a flat surface, or may be configured such that the engageable surface 31a itself has a step or an irregularity or the like. Also, the coupling body-main frame 31 may be provided with a plurality of surfaces to be engageable surface 31a.

Further, as exemplified in Embodiment 3 or 4 to be described later, this may alternatively be configured such that a leading end having a size larger than the diameter of the aforementioned coupling body-main frame 31 is provided at the leading end of the bar-shaped coupling body-main frame 31 and a step section created with the leading end section and the coupling body-main frame 31 is utilized as the engageable surface 31a. More specifically, the coupling body-main frame 31 may have the leading end section like a "pileus (cap) of a mushroom". Alternatively, a plurality of protrusions may be arranged in the outer circumference in vicinity of the leading end to form an engaging section that can be substantially considered to be a surface, which may be utilized as the engageable surface 31a.

The female coupling body 20A includes the insertion space S0 for inserting and withdrawing the male coupling body 30A (coupling body-main frame 31). Then, the main frame is constituted by the support member 21, and the lever member 22 is provided in this support member 21, and the support member 21 is coupled or connected to the lever member 22 through the engaging member 23 and the link member 24 and through the fixing pin member 251.

The support member 21 has a shape for supporting the state that the male coupling body 30A (coupling body-main frame 31) is inserted in the insertion space S0, and in the present embodiment, the support front section 21a has a shape that extends toward a direction perpendicular to the inserting direction D1 for inserting the male coupling body 30A (withdrawing direction D2), and an insertion aperture 21c (indicated by a broken line in FIGS. 1A and 2A) is formed in the substantially central portion. The support side section 21b is installed vertically against the aforementioned support front section 21a in the side rear section of the support front section 21a (rear section of the left side in FIGS. 1A and 2A). Consequently, the support side section 21b would have a shape that extends toward the direction along the inserting direction D1 of the male coupling body 30A (withdrawing direction D2).

Specific shape of the support member 21 is not particularly limited, and it may be sufficient to adopt any shape as long as the shape is capable of supporting the inserted male coupling body 30A and rotatably fixing the lever member 22 as will be discussed later. Since the support member 21 corresponds to substantially the main frame (main body) of the female coupling body 20A as described above, it may be constituted by various types of shapes such as a single member, a frame shape, a housing shape and the like, according to the use condition of the coupling/uncoupling mechanism 10A. While the support front section 21a of the female coupling body 20A is in contact with the main frame-support section 32 of the male coupling body 30A so as to mutually overlap in the coupling status illustrated in FIG. 1A, the representation of the main frame-support section 32 in the drawing of FIG. 1A is the schematic representation as described above, and therefore, it is not necessary to configure that the coupling status of the support front section 21a to the main frame-support section 32 is made so as to mutually overlap.

The lever member 22 is mounted on the other side-rear section of the support front section 21a (rear section of the right side in FIGS. 1A and 2A) through a lever support-coupling section 261. When it is presumed that one end of the lever member 22 is mounted on the side rear section of the support front section 21a, the other end thereof is connected to the rear end of the support side section 21b (end section in the side of the inserting direction D1) through the fixing pin member 251. Since the insertion space S0 is formed between the support side section 21b and the lever member 22, the lever member 22 would be provided at the position facing the insertion space S0.

The lever support-coupling section 261 for coupling one end (leading edge) of the lever member 22 to the support front section 21a serves as a rotation axis. Hence, the lever member 22 is configured such that the other end (rear end) is movable for the support member 21. The moving direction of the other end of the lever member 22 may be at least a direction toward the side opposite to the insertion space S0, or namely, a direction of bold arrow D3 (on the observers' right and lower in FIG. 1A) in FIG. 1A. In other words, since the lever member 22 is closed in the coupled status shown in FIG. 1A, the lever member 22 may be configured to be movable in at least the outer opening direction. Although it may also be, of course, configured to be movable in a closing direction toward the insertion space S0 (on the observers' left, and inside direction, in FIG. 1A), the male coupling body 30A in the state of being coupled to the female coupling body 20A is changed to the withdrawable state by the opening of the lever member 22 as will be discussed later, and therefore it is necessary to be configured such that at least the lever member 22 is opened.

Specific configuration of the lever member 22 is not particularly limited, and a known configuration for the "lever", such as substantially rod-shape, substantially column-shape, substantially plate-shape and the like may be adopted. The lever member 22 releases the coupling status of the male coupling body 30A by moving toward direction for opening the other end when the fixing with the fixing pin member 251 is released, and therefore may have a length dimension so that the position of the other end is definitely different between the closed state (coupling status) and in the opened state (state of releasing the coupling). Here, the lever member 22 is also schematically shown in FIG. 1A, and it is not intended to limit to such a columnar or a plate-like shape as illustrated.

The other end of the lever member 22 is connected to the rear end of the support side section 21b with the fixing pin member 251, and the other end is also connected to the leading end with the engaging member 23 and the link member 24. One end of the engaging member 23 is rotatably connected at a position between both ends of the lever member 22 through the lever rotation-coupling section 262, and the other end thereof is rotatably connected at one end of the link member 24 through a link rotation-coupling section 263.

Also, the other end of the link member 24 is rotatably connected to the support side section 21b through a link support-coupling section 264.

The engaging member 23 has an engaging surface 23a, which is contacted with the engageable surface 31a of the coupling body-main frame 31 (male coupling body 30A) from the withdrawing direction D2 (lower side in FIG. 1B) as shown in FIG. 1B. In the configuration shown in FIG. 1A, the engaging member 23 has a section protruding toward the side of the insertion space S0 (on the observers' left in FIG. 1A) between the lever rotation-coupling section 262 and the link rotation-coupling section 263, and the engaging surface 23a is provided in the position at the back of this section (upper side in FIG. 1A) and adjacent to the link rotation-coupling section 263.

The link member 24 is a member for coupling the engaging member 23 to the support member 21 (support side section 21b), and in the example shown in FIG. 1A, is a member having a length sufficient for connecting the link support-coupling section 264 to the link rotation-coupling section 263. While the position of the other end of the link member 24, (in other words, the link support-coupling section 264) is the substantially intermediate position between the forward end and the rear end of the support side section 21b in the example shown in FIG. 1A and FIG. 2A, the present invention is not limited to this configuration, and coupling can be achieved to any position in the support member 21, as long as the position achieves that one end of the link member 24 is suitably movable toward the withdrawing direction D2 viewed from the other end thereof.

The other end of the engaging member 23 is connected to one end of the link member 24 through the link rotation-coupling section 263, and the link rotation-coupling section 263 is configured to be movable toward the withdrawing direction D2, corresponding to the movement of the lever member 22 as described above. Consequently, it is necessary to configure the positional relations of the lever rotation-coupling section 262 and the link rotation-coupling section 263 for fixing both ends of the engaging member 23 that the link rotation-coupling section 263 (in the side of the other end) is positioned in the side of the inserting direction D1, viewed from the lever rotation-coupling section 262 (in the side of one end). It is also necessary that the engaging surface 23a of the engaging member 23 is provided in the position in vicinity of the link rotation-coupling section 263.

The link rotation-coupling section 263 serves as a central axis for rotating the engaging member 23, which allows contacting the engageable surface 31a of the inserted male coupling body 30A (coupling body-main frame 31) with the engaging surface 23a of the engaging member 23, and releasing this contacting. Also, the engageable surface 31a of the coupling body-main frame 31 faces the withdrawing direction D2 as described above. The engaging member 23, which is coupled to the lever member 22, moves in accordance with the movement of the lever member 22 so as to be apart from the male coupling body 30A (direction toward the side opposite to the insertion space S0). Hence, in order to release the engaging surface 23a from the condition of being contacted with the engageable surface 31a, it is required that the engaging surface 23a constantly move toward the withdrawing direction D2, and for that purpose, the link rotation-coupling section 263 would be positioned to be away from the lever rotation-coupling section 262 in the inserting direction D1.

Taking the front and back direction of the female coupling body 20A as a reference, the link rotation-coupling section 263 is positioned in the rear side, and the lever rotation-coupling section 262 is positioned in the front side, and the engaging member 23 is basically moved to the front side by the move of the other end of the lever member 22 toward the opening direction (arrow D3). Since the engageable surface 31a of the coupling body-main frame 31 faces the front side, the contacting of the engaging surface 23a with the engageable surface 31a is released when the engaging member 23 moves to the front side. If it is assumed that the link rotation-coupling section 263 is positioned to be closer to the side of the withdrawing direction D2 (front side) than the lever rotation-coupling section 262, the engaging member 23 is moved toward the inserting direction D1 (rear side) by the opening of the lever member 22, and thus the contacting of the engaging surface 23a and the engageable surface 31a is not released in such case.

If the positional relation of the lever rotation-coupling section 262 with the link rotation-coupling section 263 is as described above, the coupling of the female coupling body 20A with the male coupling body 30A is released by opening the lever member 22, and inversely, the male coupling body 30A is coupled to the female coupling body 20A by closing the lever member 22 from the opened state. Further, the other end of the lever member 22 is fixed to the support member 21 with the fixing pin member 251 to maintain the coupling status of the female coupling body 20A and the male coupling body 30A.

Specific configuration of the engaging member 23 is not limited to the configuration shown in FIG. 1A, and any type of configuration may be adopted provided that it includes the engaging surface 23a and that it is rotatable by means of the lever rotation-coupling section 262 and the link rotation-coupling section 263. Also, specific configuration of the link member 24 is not limited to the configuration shown in FIG. 1A, and any type of configuration may be adopted provided that it is configured to couple the engaging member 23 to the support member 21.

Also, while the other end of the lever member 22 is fixed to the rear end of the support side section 21b in the support member 21 by the fixing pin member 251, it is not limited to this, and other configurations may alternatively be employed. More specifically, it is sufficient that the coupling/uncoupling mechanism 10A comprises a lever-fixing member for fixing the lever member 22 to the support member 21 in the releasable manner so as to disturb the movement of the other end of the lever member 22, and the aforementioned lever-fixing member is not limited to the fixing pin member 251. For the lever-fixing member, a string-type member or a yarn-type member may be employed, or a mechanical mechanism may be employed, or a member or a mechanism for utilizing a chemical reaction to release the fixed state may be employed.

Also, each of the aforementioned members that constitute the female coupling body 20A and the male coupling body 30A may be formed by employing various types of known materials according to the use conditions for the coupling/uncoupling mechanism 10A. Also, it is needless to point out that different materials may be employed, according to the physical properties required by the respective members or conditions. Further, the female coupling body 20A and the male coupling body 30A may contain configurations except the above-described respective members, or some of these members may not be contained.

Here, the lever support-coupling section 261, the lever rotation-coupling section 262, the link rotation-coupling section 263 and the link support-coupling section 264 serve as rotatably coupling to the support member 21, the lever member 22, the engaging member 23 and the link member 24, respectively. Further, coupling sections of these members also serve as fulcrums or supporting points for the movements of the lever member 22, the engaging member 23 and the link member 24. Hence, the lever support-coupling section 261, the lever rotation-coupling section 262, the link rotation-coupling section 263 and the link support-coupling section 264 may alternatively be referred to as a first supporting point section, a second supporting point section, a third supporting point section and a fourth supporting point section.

[Actions of Coupling/Uncoupling Mechanism]

In the next, the coupling and the release of the coupling of the female coupling body 20A and the male coupling body 30A in the coupling/uncoupling mechanism 10A according to the present embodiment will be described in reference to FIG. 1A, FIG. 1B and FIG. 2A, and in addition, FIG. 2B and FIG. 3.

When the female coupling body 20A and the male coupling body 30A are in the coupling status as shown in FIG. 1A, the male coupling body 30A (coupling body-main frame 31) is inserted in the insertion space S0 of the female coupling body 20A, and the other end of the lever member 22 is positioned to be closer to the insertion space S0. At this time, the state that the engaging surface 23a of the engaging member 23 is contacted with the engageable surface 31a of the male coupling body 30A (coupling body-main frame 31) as shown in FIG. 1B is maintained.

In the female coupling body 20A, as described above, one end of the engaging member 23 is connected to a position between the both ends of the lever member 22 by the lever rotation-coupling section 262, and the other end of the engaging member 23 is connected to the link member 24 by the link rotation-coupling section 263. Since the link rotation-coupling section 263 is positioned away from the lever rotation-coupling section 262 and closer to the engaging surface 23a in the inserting direction D1, in the coupling status show in FIG. 1A and FIG. 1B, the force, which is required for the move of the lever member 22 toward the direction opposite to the side of the insertion space S0, can be relatively reduced.

Figure 3:
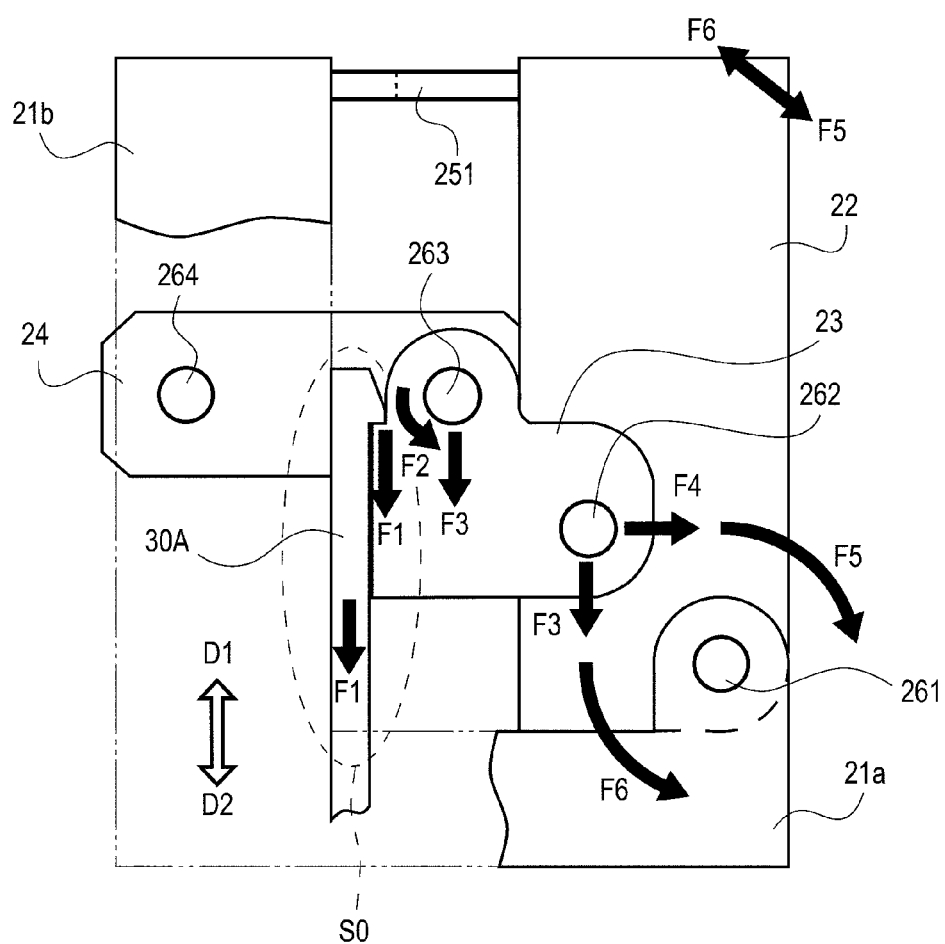
FIG. 3 is a schematic diagram, for describing the forces acting over the respective coupling sections in the coupling status of the coupling/uncoupling mechanism shown in FIG. 1A.

More specifically, in the state that the male coupling body 30A is coupled to the female coupling body 20A, a coupling force F1 (black arrow in FIG. 3) toward the withdrawing direction D2 is exerted over the female coupling body 20A by the male coupling body 30A as shown in FIG. 3. Since the engageable surface 31a of the male coupling body 30A (coupling body-main frame 31) is contacted with the engaging surface 23a of the engaging member 23 at this time, the coupling force F1 is directly applied to the engaging member 23. Hence, in the engaging member 23, a lever-side torque F2 (black arrow in FIG. 3) is generated, which is a torque directed toward the side of the lever member 22 around the link rotation-coupling section 263 closer to the engaging surface 23a as a center of the torque, and a withdrawing-side pushing force F3 (black arrow in FIG. 3) is generated, which is a force for pushing the aforementioned link rotation-coupling section 263 toward the withdrawing direction D2.

Further, in the lever rotation-coupling section 262 positioned to be closer to the side of the withdrawing direction D2 than the link rotation-coupling section 263, the lever-side torque F2 generates a lever-side pushing force F4 (black arrow in FIG. 3), which is a force for pushing the lever rotation-coupling section 262 toward the lever side, and also generates a withdrawing-side pushing force F3. Among these, the withdrawing-side pushing force F3 creates an outward force F5 in the lever support-coupling section 261 (black arrow in FIG. 3), which is a force directed to open the other end of the lever member 22, and the lever-side pushing force F4 creates an inward force F6 (black arrow in FIG. 3), which is a force directed so as not to form outside pivoting of the lever member 22, or in other words a force directed toward the inside (side of the insertion space S0) (see also black arrow on observers' right in FIG. 3).

More specifically, since both of the outward force F5 and the inward force F6 are created in the lever support-coupling section 261, the outward force F5 can be created to be slightly stronger than the inward force F6, or the outward force F5 can be created to be slightly weaker than the inward force F6, depending on the positional relations of the coupling sections (supporting points). Hence, the outward force F5 of the lever member 22 can be created to be sufficiently weaker, or the state that the lever member 22 can be moved toward the outside (direction to open) with a smaller force can be configured.

If the outward force F5 of the lever member 22 is designed to be sufficiently smaller, the lever member 22 can be easily fixed to the support member 21 with the fixing pin member 251. If the move of the lever member 22 toward the outside by the fixing pin member 251 is not caused, the state of the contacting of the engageable surface 31a of the male coupling body 30A (coupling body-main frame 31) with the engaging surface 23a of the engaging member 23 is maintained, and therefore the coupling of the male coupling body 30A with the female coupling body 20A is retained.

Next, the fixing pin member 251 is broken at the position of the broken line shown in FIG. 1A to release the fixed state of the lever member 22 fixed in the support member 21 (support side section 21b). This allows the other end of the lever member 22 moving along the direction of being apart from the insertion space S0 as shown in FIG. 2A (outward, direction to open). According to the above-described movement, the engaging surface 23a of the engaging member 23 moves toward the withdrawing direction D2, so that the contacting of the engaging surface 23a of the engaging member 23 with the engageable surface 31a of the male coupling body 30A (the coupling body-main frame 31) is released, as shown in FIG. 2B. Here, FIG. 2B is an enlarged view of the region II shown in FIG. 2A.

While the positional relations among the lever support-coupling section 261, the lever rotation-coupling section 262, the link rotation-coupling section 263 and the link support-coupling section 264 may be satisfied if at least the positional relation of the lever rotation-coupling section 262 and the link rotation-coupling section 263 are as the above-described relation as described above, and an example of a preferable positional relation may be exemplified by showing the positional relation shown in FIG. 1A and FIG. 2A.

In the coupling status shown in FIG. 1A, the lever support-coupling section 261 and the link rotation-coupling section 263 are arranged in this sequence along the direction from the lever member 22 to the insertion space S0, and the lever rotation-coupling section 262 is disposed in the withdrawing direction D2 rather than the link rotation-coupling section 263 and the link support-coupling section 264 is disposed in the position so as to form the insertion space S0 interposed between the link rotation-coupling section 263 and itself.

If the aforementioned respective coupling sections are in the aforementioned positional relations, at least the link rotation-coupling section 263 (and additionally the link support-coupling section 264, depending upon the arrangement) would be positioned to be the closest to the side of the inserting direction D1, in the view of the female coupling body 20A from the side of the withdrawing direction D2. In this state, the lever support-coupling section 261, the lever rotation-coupling section 262 and the link rotation-coupling section 263 are arranged in this sequence viewed from side of withdrawing direction D2, so that the magnitudes of the lever-side torque F2 the withdrawing-side pushing force F3 and the lever-side pushing force F4, which are acting over these respective coupling sections, can be defined within the preferable ranges.

Also, if the aforementioned positional relation is satisfied, the engaging member 23 rotates so that the link support-coupling section 264 is spaced apart from the lever rotation-coupling section 262, by simply opening the other end of the lever member 22 or by moving the other end of the lever member 22 toward the outside with a smaller force, and the position of the link rotation-coupling section 263 gradually moves toward the withdrawing direction D2 according to this rotation, and hence, the engaging surface 23a near the link rotation-coupling section 263 also moves toward the withdrawing direction D2. In this state, the contacting of the engaging surface 23a of the engaging member 23 with the engageable surface 31a of the male coupling body 30A (the coupling body-main frame 31) is released, and consequently, the coupling status of the male coupling body 30A with the female coupling body 20A can be released by simply opening the lever member 22 or by moving the lever member 22 with a smaller force.

Application Examples of Coupling/Uncoupling Mechanism

The coupling/uncoupling mechanism 10A according to the present embodiment is preferably broadly employed in applications for mutually coupling and uncoupling two couple-able sections. The application examples of the coupling/uncoupling mechanism 10A will be described in reference to FIG. 4. For example, if the couple-able member is a strip-shaped band member 11 as shown in FIG. 4A, the male coupling body 30A is mounted to one end 11a of the band member 11 and the female coupling body 20A are mounted the other end 11b, and these are coupled to each other with the coupling/uncoupling mechanism 10A to form the annular band member 11.

Figure 4A:
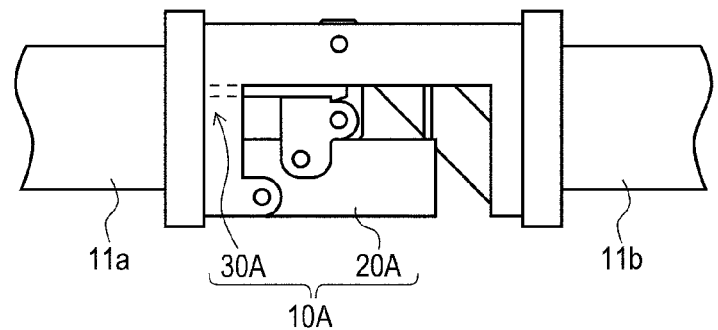
FIG. 4A to FIG. 4C are schematic diagrams, showing an exemplary implementation of the application for the coupling/uncoupling mechanism shown in FIG. 1A.

While both ends 11a and 11b of the single band member 11 are coupled to each other by the coupling/uncoupling mechanism 10A in the example shown in FIG. 4A, it is needless to point out that this can also be applicable to the application for coupling respective one ends of two band members 11. If a single band member 11 is coupled itself to form a ring, the coupling/uncoupling mechanism 10A is employed to couple two couple-able sections of the single couple-able member, and on the other hand, if the respective one ends of the two band members 11 are coupled, this is employed to couple two couple-able sections of the two couple-able members.

Figure 4B:
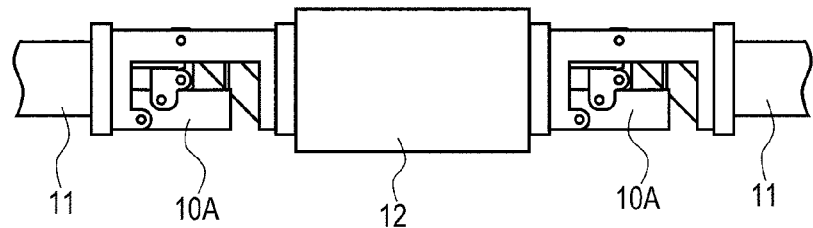

Also, the respective coupling/uncoupling mechanisms 10A are mounted to both ends of the intermediate member 12 as shown in FIG. 4B to allow coupling the band members 11 through the intermediate member 12. Even in such a case, the coupling/uncoupling mechanism 10A may be employed for annularly coupling the single band member 11 through the intermediate member 12, or may be employed for annularly coupling two band members 11 in order to mutually coupling thereof.

Figure 4C:
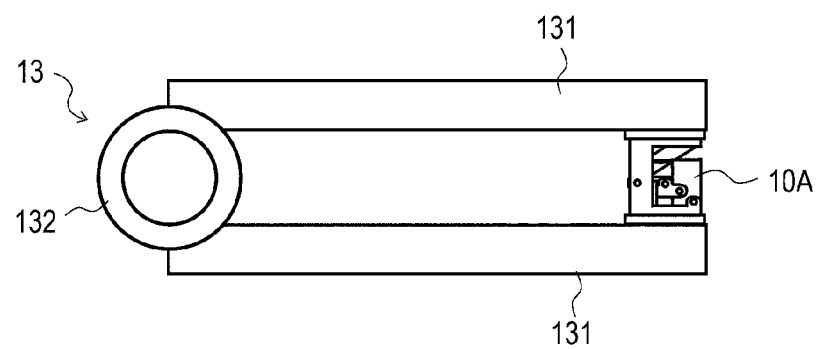

Further, in an open-shut device 13, in which a pair of plate-like members 131 are configured to be openable and closable manner by a rotating shaft section 132 as shown in FIG. 4C, the plate-like members 131 may be coupled to each other by the coupling/uncoupling mechanism 10A in a position in the side opposite to the rotating shaft section 132.

In particular, according to the present embodiment, sufficiently reduced outward force F5 of the lever member 22 (see FIG. 3) is achieved, such that it is sufficient to retain the coupling between the male coupling body 30A and the female coupling body 20A by inhibiting the movement of the lever member 22 with a smaller force. Hence, the state of the coupling of the band member 11 with the plate-like member 131 can be maintained with only a smaller force. Also, since the lever member 22 can be moved with a smaller force, the movement of the lever member 22 is inhibited by the fixing pin member 251 when the coupling is to be retained (see FIG. 1A and FIG. 2A), and the fixing pin member 251 is broken or removed when the coupling is to be released, and therefore it is possible to separate the two couple-able sections by simply releasing the inhibition of the movement. As described above, according to the coupling/uncoupling mechanism 10A of the present embodiment, state of maintaining the condition of coupling two couple-able members or couple-able sections with a smaller force or without a maintaining force can be further stabilized.

Embodiment 2

A coupling/uncoupling mechanism according to Embodiment 2 of the present invention is configured to additionally comprise a fastening member serving as a lever-fixing member for the other end of the lever member (rear end) is fastened to a rear end of the support side section in the same configuration of the coupling/uncoupling mechanism according to the aforementioned Embodiment 1.

[Configuration of Coupling/Uncoupling Mechanism]

Figure 5:
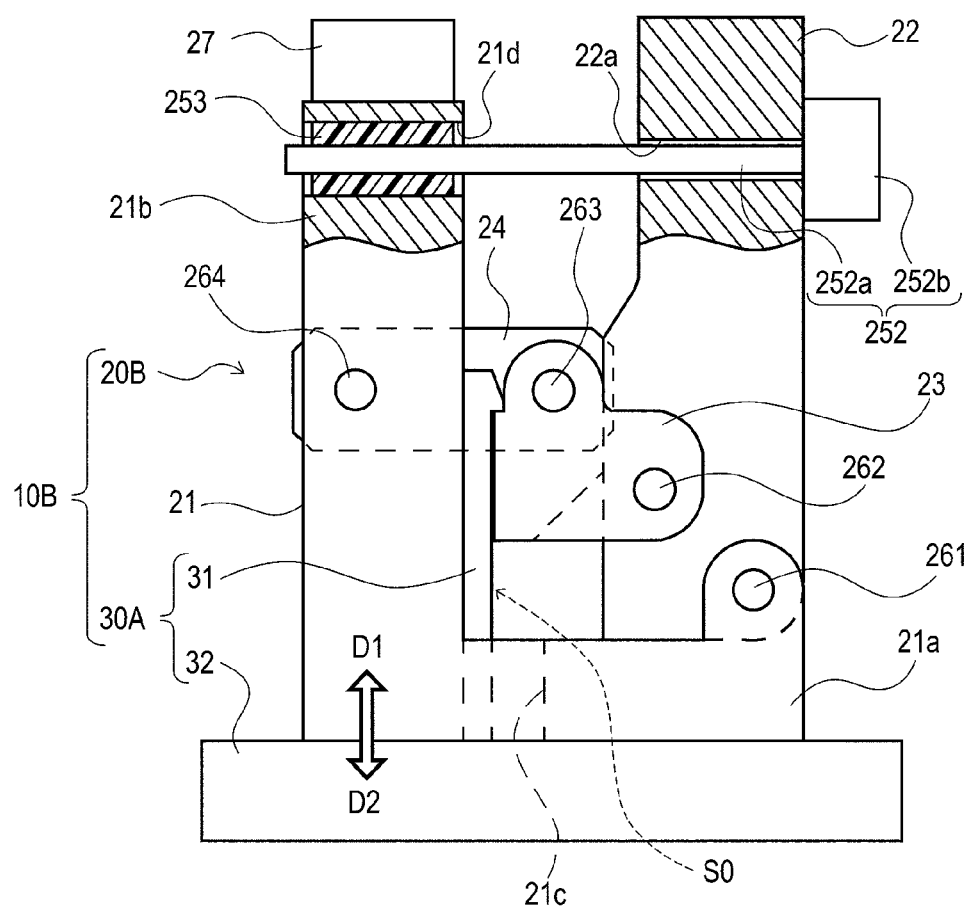
FIG. 5 is a schematic partial cross-sectional view, showing a configuration of the coupling/uncoupling mechanism according to Embodiment 2 of the present invention.
Figure 6A:
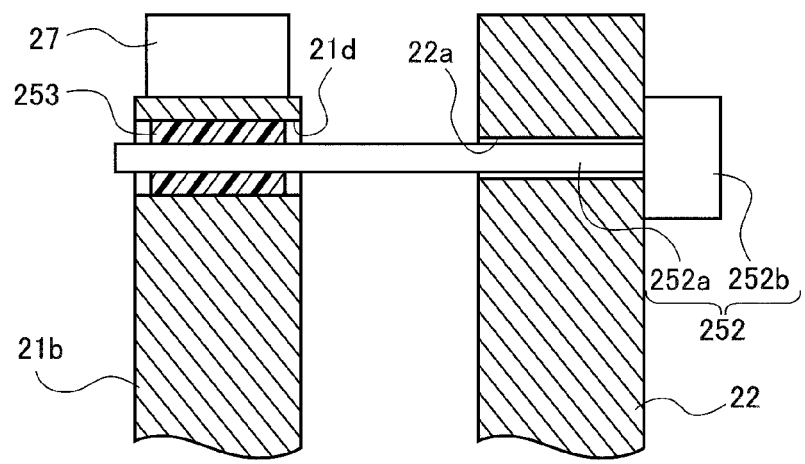
FIG. 6A and FIG. 6B are schematic diagrams, showing a fix-release operation of a fastening member included in the coupling/uncoupling mechanism shown in FIG. 5.

First of all, the coupling/uncoupling mechanism according to Embodiment 2 of the present invention will be described in reference to FIG. 5, FIG. 6A and FIG. 6B. As shown in FIG. 5, a coupling/uncoupling mechanism 10B according to the present embodiment is composed of a female coupling body 20A and a male coupling body 30A, and the female coupling body 20B is composed of a support member 21, a lever member 22, an engaging member 23, a link member 24, a fastening pin member 252, a fastening member-fixing material 253, and an insertion hole-heating unit 27, and the male coupling body 30A is composed of a coupling body-main frame 31 and a main frame-support section 32.

While the basic configuration of the coupling/uncoupling mechanism 10B is similar to the configuration of the coupling/uncoupling mechanism 10A according to the aforementioned Embodiment 1, a difference is that the fastening pin member 252 is provided so as to extend through the rear end of the support side section 21b and the other end (rear end) of the lever member 22 in the female coupling body 20B, and the lever member 22 is fixed to the support side section 21b by this fastening pin member 252. Since the fixing pin member 251 in the aforementioned Embodiment 1 can also be referred to as a "fixing member" for fixing the lever member 22 in the support side section 21b, the fastening pin member 252 in the present embodiment may be referred to as a "fastening member" for fastening the support side section 21b with the lever member 22.

The fastening pin member 252 is composed of a bar-shaped rod section 252a and a head section 252b. The head section 252b has a diameter that is larger than that of the rod section 252a, and is provided integrally with the other end of the rod section 252a.

A fastening member-through hole 22a for inserting the fastening pin member 252 is provided in the other end of the lever member 22. The inner diameter of the fastening member-through hole 22a is smaller than the diameter of the head section 252b. On the other hand, a fastening member-insertion hole 21d for inserting one end of the fastening pin member 252 to fix thereof is provided in the rear end of the support side section 21b. An insertion hole-heating unit 27 for heating the interior of the aforementioned fastening member-insertion hole 21d is provided in the position adjacent to the fastening member-insertion hole 21d.

When the male coupling body 30A and the female coupling body 20B are coupled, the rod section 252a of the fastening pin member 252 is inserted in the fastening member-through hole 22a and one end thereof is extended toward the support side section 21b so as to be inserted in the fastening member-insertion hole 21d provided in the aforementioned support side section 21b. In this state, the other end of the fastening pin member 252 would be inserted in fastening member-through hole 22a so that the head section 252b is positioned in the side opposite to the fastening member-insertion hole 21d. Since the diameter of the head section 252b is larger than then inner diameter of the fastening member-through hole 22a, the head section 252b is contacted with the outer circumference of the lever member 22 without extending through the fastening member-through hole 22a. Hence, the fastening pin member 252 (rod section 252a) would be is mechanically engaged against the lever member 22, so that it is prevented to extend through the fastening member-through hole 22a, and therefore the movement toward the support side section 21b (on the observers' left in FIG. 5) is limited by the head section 252b. This allows appropriately connecting the other end of the lever member 22 to the support side section 21b with a simple configuration.

Also, one end of the fastening pin member 252 (rod section 252a) is fixed by the fastening member-fixing material 253 in the state of being inserted in the fastening member-insertion hole 21d. Typically, as shown in FIG. 5 and FIG. 6A, the aforementioned fastening member-insertion hole 21d is blocked by the fastening member-fixing material 253 in the state that one end of the rod section 252a is inserted in the fastening member-insertion hole 21d to fix one end of the rod section 252a. The fastening member-fixing material 253 is made of a thermoplastic material, and is hardened at a temperature within a temperature range assumed for the operating environment of the coupling/uncoupling mechanism 10B, and is softened or melted once the inside of the fastening member-insertion hole 21d is heated by the insertion hole-heating unit 27.

Figure 6B:
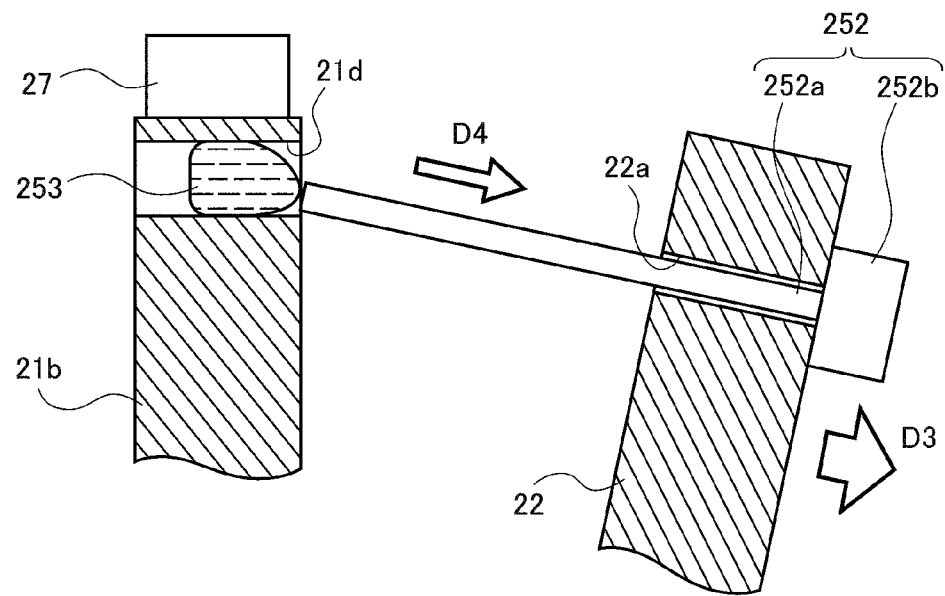

According to the aforementioned configuration, as shown in FIG. 6B, the insertion hole-heating unit 27 is activated to heat the fastening member-fixing material 253, thereby causing the softening or melting. Thus, one end of the fastening pin member 252 fixed to the fastening member-insertion hole 21d by the fastening member-fixing material 253 is detached from the fastening member-insertion hole 21d. This allows the fastening pin member 252 moving toward the outside shown by the arrow D4 in FIG. 6B, so that the other end of the lever member 22 fastened at the rear end of the support side section 21b is released from the fixed state such that the lever member 22 moves to the outside (direction to open, direction of arrow D3 in FIG. 6B).

Once the lever member 22 moves to the outside, the contacting of the engageable surface 31a of the male coupling body 30A (coupling body-main frame 31) with the engaging surface 23a of the engaging member 23 is released in the female coupling body 20B (see FIG. 2B) to cancel the coupling of the male coupling body 30A with the female coupling body 20B. Hence, the female coupling body 20B and the male coupling body 30A can be easily separated with a simple configuration.

Here, specific configuration of the fastening pin member 252 is not particularly limited, and may be composed of a material having a suitable strength for successfully fastening the support side section 21b with the lever member 22 and having a property that can be easily separated from the softened or melted fastening member-fixing material 253. An example may be a metallic pin member. Also, specific configuration of the fastening member-fixing material 253 is not particularly limited, and may be composed of a known thermoplastic material. Generally, known thermoplastic resins can be preferably employed. Also, specific configuration of the insertion hole-heating unit 27 is not particularly limited, and known heaters or heating apparatuses can be preferably employed.

Modified Embodiment

Figure 7A:
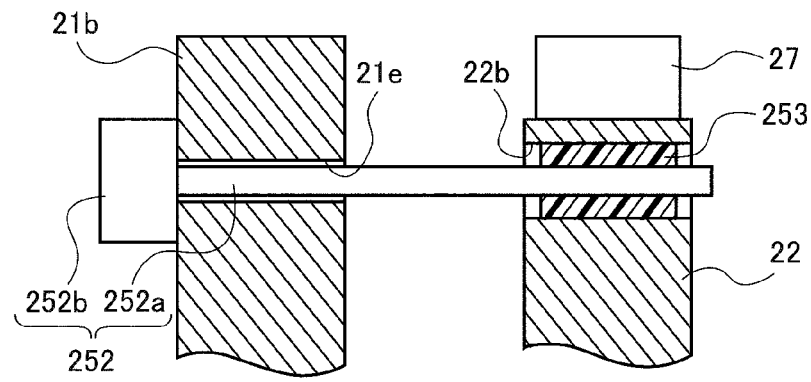
FIG. 7A to FIG. 7C are schematic diagrams, showing other exemplary implementation of the fastening member included in the coupling/uncoupling mechanism shown in FIG. 5.

In the next, a modified embodiment of the coupling/uncoupling mechanism 10B according to the present embodiment will be described in reference to FIG. 7A to FIG. 7C. While the fastening member of the present embodiment is achieved by the configuration, in which the head section 252b of the fastening pin member 252 is positioned outside of the lever member 22 and the leading end of the rod section 252a is fixed in the fastening member-insertion hole 21d of the support side section 21b by the fastening member-fixing material 253 as described above, the positions of the head section 252b and the leading end of the rod section 252a may alternatively be inverse. More specifically, it may be configured as shown in FIG. 7A that the fastening member-through hole 21e is formed in the support side section 21b, the fastening member-insertion hole 22b is formed in the lever member 22 and the leading end of the rod section 252a is fixed in the lever member 22 by the fastening member-fixing material 253.

The fastening member employed in the present invention may be a lever-fixing member, which is configured such that the connection of the other end of the lever member 22 and the support side section 21b is achieved at the both ends thereof to allow maintaining the prevention for the outward movement of the other end of the aforementioned lever member 22. Hence, any type of configurations including a fastening member like the fastening pin member 252 in the present embodiment, and a fixing member like the fixing pin member 251 in the aforementioned Embodiment 1 may be employed. Also, one end of the fastening member may be fixed by any of the lever member 22 and the support side section 21b.

Also, the fastening pin member 252 may be configured to fasten the other end (rear end) of the lever member 22 with the support member 21, and it is not necessary to be configured to fasten the other end of the lever member 22 with the rear end of the support side section 21b. However, as have been described in the present embodiment, the configuration for fastening the other end of the lever member 22 with the rear end of the support side section 21b would achieve the connection of the lever member 22 and the support side section 21b, at the end sections of each other, and therefore if the lengths of the lever member 22 and of the support side section 21b are designed to be equivalent, it can avoid using longer fastening pin member 252.

In addition to above, if the fastening member-insertion hole 21d is provided in the support side section 21b and the fastening member-through hole 22a is provided in the other end of the lever member 22 as shown in FIG. 5, there is a case that the fastening state can be more effectively maintained, according to the configuration of the female coupling body 20B. For example, since the support side section 21b is a portion of the support member 21 and the support member 21 constitutes a portion of the main frame of the female coupling body 20B, the thickness thereof may be relatively larger than the lever member 22. Hence, longer fastening member-insertion hole 21d may be employed to provide increased contact area between the fastening member-fixing material 253 and the inner surface of the fastening member-insertion hole 21d. Also, since the other end of the lever member 22 is mechanically fixed by the head section 252b, shorter fastening member-through hole 22a may be employed, and hence, this can provide more compact dimension of the other end of the lever member 22.

Also, the fastening member employed in the present embodiment is not limited to the fastening pin member 252, and other configuration may be adopted. For example, a fastening wire 254 can be employed as shown in FIG. 7B, in place of the fastening pin member 252. Both ends of this fastening wire 254 are inserted in the fastening member-insertion hole 21d by looping and turning around the fastening wire 254 in the outside of the other end of the lever member 22, and is fixed by the fastening member-fixing material 253. Also, the lever member 22 is provided with a wire carrier section 22c for receiving the fastening wire 254 formed in at least in the outside thereof, and preferably in the circumference thereof leading to the outside thereof. As described above, the fastening wire 254 is received with the wire carrier section 22c, so that the fastening wire 254 is mechanically fixed (engaged) to the other end of the lever member 22. Hence, the fastening wire 254 would function as a fastening member, similarly as the fastening pin member 252.

Meanwhile, when this fastening wire 254 is considered as a single wire itself, it is configured that the both ends thereof are inserted in the fastening member-insertion hole 21d by looping and being turned around, and on the other hand, when the fastening wire 254 having the turned shape is considered as a whole fastening member, the both ends of the wire serve as one end of the fastening member, the looped section serves as the other end of the fastening member. Hence, it can also be expressed for the configuration shown in FIG. 7B that one end of the fastening member is inserted in the fastening member-insertion hole 21d and is fixed by the fastening member-fixing material 253, and the other end of the fastening member is mechanically fixed by the other end of the lever member 22.

Further, in the present embodiment, the fastening member may be mounted on the other end of the lever member 22. For example, as shown in FIG. 7C, a fixed wire 255 may be mounted in the inside of the other end of the lever member 22 (side of the fastening member-insertion hole 21d), and one end of this fixed wire 255 may be inserted in the fastening member-insertion hole 21d and may be fixed by the fastening member-fixing material 253. As described above, the fastening member-insertion hole 21d or 22b for inserting one end of the fastening member may be formed in any one of the rear end of the support side section 21b and the other end (rear end) of the lever member 22 in the present embodiment, and one end of the fastening member may be fixed in the interior of the aforementioned fastening member-insertion hole 21d or 22b by the fastening member-fixing material 253.

Here, the fastening member is not limited to the fastening pin member 252 or the fastening wire 254 or the like, and other widely known configuration may also be employed. While a pin member or a string-type member having sufficient length that allows fastening the support side section 21b with the lever member 22 may be preferably employed in general, the configuration is not necessarily based on pin-type or string-type, and as long as it can fasten the lever member 22 with the support side section 21b, it may be a block-type configuration, or may be a mechanical configuration composed of a plurality of members.

Here, the coupling/uncoupling mechanism 10B according to the present embodiment has the configuration similar to that of the coupling/uncoupling mechanism 10A according to the aforementioned Embodiment 1 except the fastening member and the configuration (fixing configuration) for fixing the aforementioned fastening member in the support member 21 (or the lever member 22). However, the present invention is not limited to this, and may also be applicable to other types of configurations of the coupling/uncoupling mechanism, as long as it comprises the above-described fastening member serving as the lever-fixing member. For example, as long as it is configured to comprise at least the support member 21 and the lever member 22, and to form the insertion space S0 between these members, it is not necessary to comprise the engaging member 23, the link member 24 and the like. Consequently, it is sufficient that the coupling/uncoupling mechanism according to the present invention is constituted by the male coupling body and the female coupling body, which includes the support member, the lever member, the fastening member and the aforementioned fixing configuration.

Embodiment 3

In Embodiment 3 of the present invention, an exemplary implementation of an uncoupling structure of a cosmonautic vehicle, to which the coupling/uncoupling mechanism according to the aforementioned Embodiments 1 and 2 are applied, will be presented to further specifically describe the coupling/uncoupling mechanism according to the present invention. An uncoupling structure of a cosmonautic vehicle according to the present embodiment comprises a Marman clamp band, and a coupling/uncoupling mechanism is applied in order to release a coupling of the aforementioned Marman clamp band.

[Marman Clamp Band]

Figure 8A:
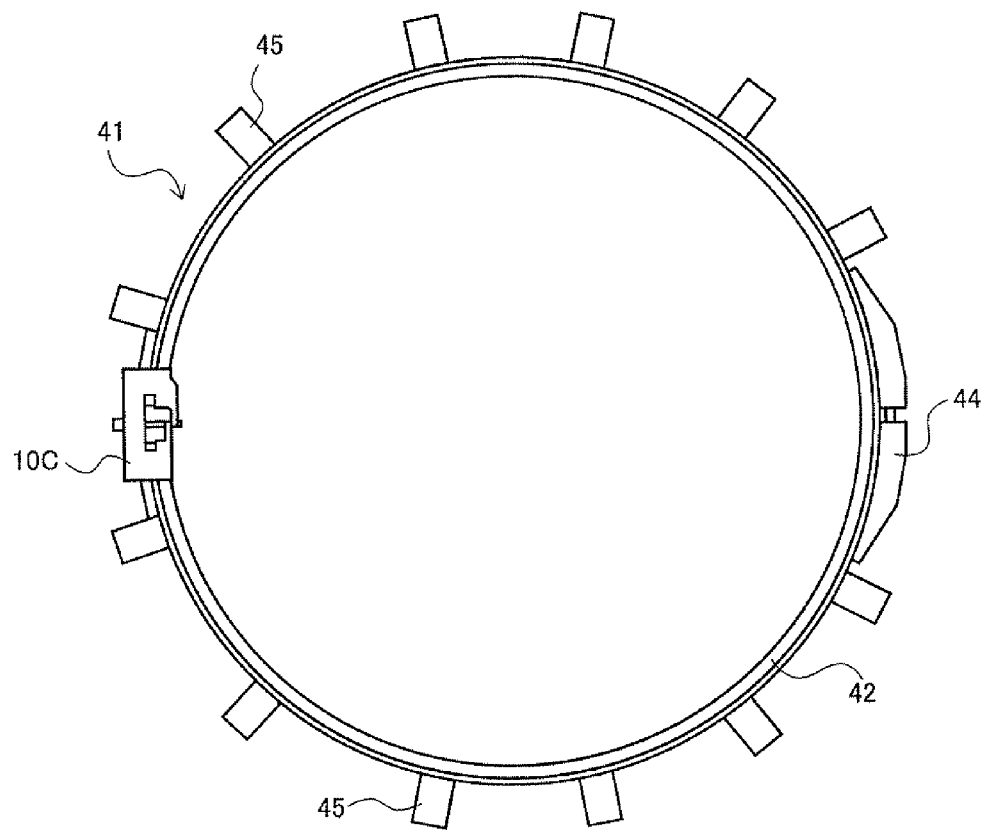
FIG. 8A is a schematic plan view, showing a configuration of a Marman clamp band comprising a coupling/uncoupling mechanism according to Embodiment 3 of the present invention.
Figure 8B:
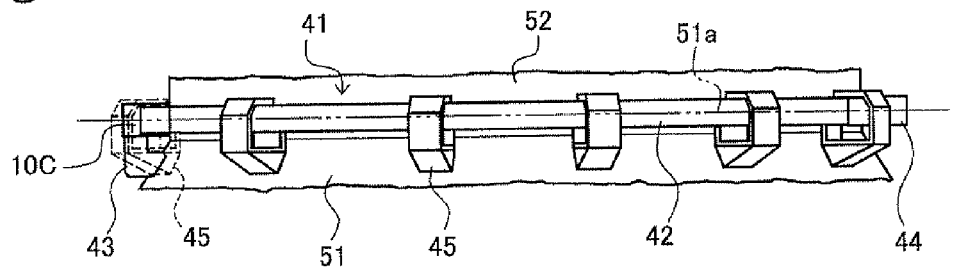
FIG. 8B is a partial side view, schematically showing a state of supporting a coupling of a rocket main frame with an artificial satellite by the Marman clamp band shown in FIG. 8A.

First of all, the Marman clamp band will be specifically described in reference to FIG. 8A and FIG. 8B. As shown in FIG. 8A, the Marman clamp band 41 according to the present embodiment comprises: a band member 42 made of a metal; a coupling/uncoupling mechanism 10C for coupling end sections of the aforementioned band member 42 to each other in a separable manner; a band tightening section 44 for tightening the band member 42 and relaxing the tightening; and a plurality of band catchers 45 for fixing the band member 42 to a rocket main frame (a rocket main body), which is not shown in FIG. 8A.

Also, as shown in FIG. 8B, the Marman clamp band 41 also comprises a buffer mechanism-fixing member 43 for fixing the coupling/uncoupling mechanism 10C on the rocket main frame 51. The rocket main frame 51 is connected to an artificial satellite 52 in the immobilizing manner by a known uncoupling structure, which is not shown in FIG. 8B, and the Marman clamp band 41 is wound up so as to surround the outer circumference of this coupling section. A satellite-coupling surface 51a, indicated with two-dot chain line in FIG. 8B, is provided in the rocket main frame 51, and a plurality of band catchers 45 and the buffer mechanism-fixing member 43 are mounted over the periphery of the satellite-coupling surface 51a. The band catchers 45 support the band member 42 in the state of being fixed to the rocket main frame 51, and the buffer mechanism-fixing member 43 supports the buffer mechanism 14 (coupling/uncoupling mechanism 10C) in the state of being fixed to the rocket main frame 51. The Marman clamp band 41 is fixed to the rocket main frame 51 in such a configuration.

In addition to above, for the purpose of the convenience in the description of the positional relations among the coupling/uncoupling mechanism 10C, the buffer mechanism-fixing member 43 and the rocket main frame 51 in FIG. 8B, the band catcher 45 adjacent to the buffer mechanism-fixing member 43 is indicated with a broken line. Also, types of the respective members or mechanisms or the like constituting the Marman clamp band 41 shown in FIG. 8A and FIG. 8B are not particularly limited, and various types of known configurations may be preferably employed. Similarly, the configurations of the rocket main frame 51 and the artificial satellite 52, the coupling state of which is maintained in the separable manner by the aforementioned Marman clamp band 41, are not particularly limited. Further, the cosmonautic vehicle, the coupling state of which is maintained by the Marman clamp band 41, is not limited to a rocket, an artificial satellite and the like, and may also be a cosmonautic vehicle of other configuration.

[Coupling/Uncoupling Mechanism]

Figure 9:
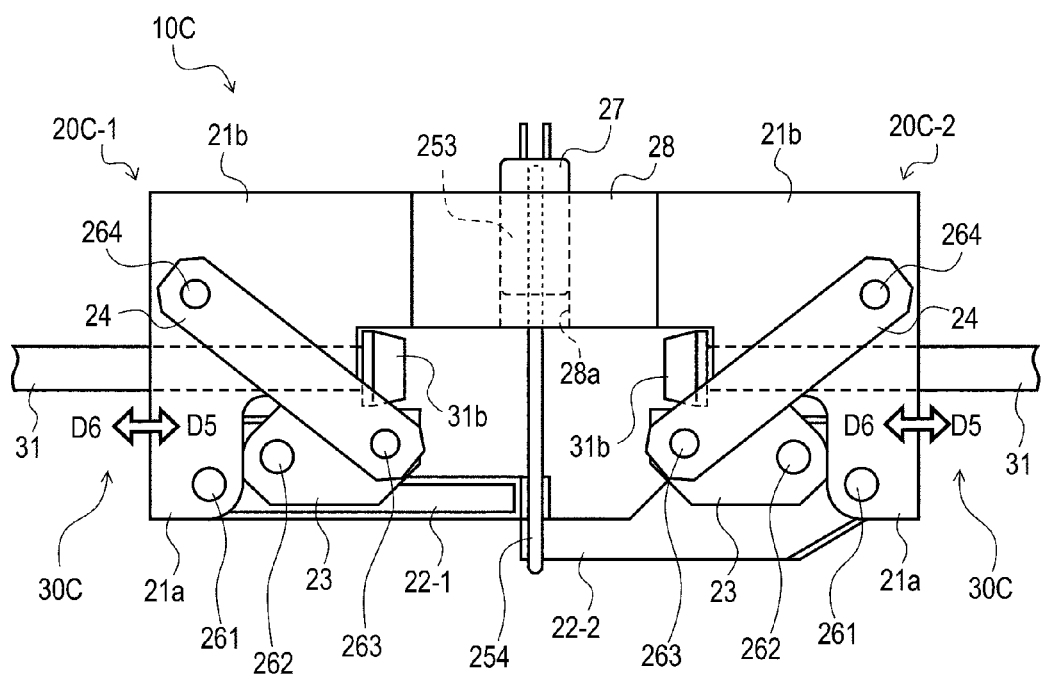
FIG. 9 is a schematic plan view, showing a configuration of a coupling/uncoupling mechanism included in the Marman clamp band shown in FIG. 8A and FIG. 8B.

Next, the coupling/uncoupling mechanism 10C will be described in reference to FIG. 9, FIG. 10A and FIG. 10B, FIG. 11A and FIG. 11B. The coupling/uncoupling mechanism 10C according to the present embodiment is configured as shown in FIG. 9, in which two female coupling bodies 20C-1 and 20C-2 are coupled at the respective rear ends of the support side section 21b with a single fastening member-supporting section 28, and a single male coupling body 30C is inserted in each of the female coupling bodies 20C-1 and 20C-2. Consequently, the coupling/uncoupling mechanism 10C is composed of two female coupling bodies 20C-1 and 20C-2 and two male coupling bodies 30C and 30C.

Each respective male coupling body 30C and the cooperating female coupling of bodies 20C-1 and 20C-2 constituting the coupling/uncoupling mechanism 10C has basically similar configuration as those of the above-described the coupling/uncoupling mechanisms 10A and 10B, as shown in FIG. 10A and FIG. 10B, and FIG. 11A and FIG. 11B. In addition to above, in FIG. 10A and FIG. 10B, and FIG. 11A and FIG. 11B, only one of the female coupling bodies 20C-1 and 20C-2 (and male coupling bodies 30C), which are substantially linear-symmetrically coupled in FIG. 9, is provided for the purpose of the convenience in the description.

More specifically, each of the female coupling bodies 20C-1 and 20C-2 comprises the support member 21, the lever member 22, the engaging member 23, and the link member 24, which are connected via the lever support-coupling section 261, the lever rotation-coupling section 262, the link rotation-coupling section 263 and the link support-coupling section 264.

Also, each of the male coupling bodies 30C and 30C has the coupling body-main frame 31. Each of the coupling body-main frames 31 is fixed to the band end of the band member 42, though it is not shown here. Also, as shown in FIG. 9, FIG. 10A and FIG. 10B, FIG. 11A and FIG. 11B, a cap section 31b is provided in the leading end of the coupling body-main frame 31, and the engageable surface 31a is formed by this cap section 31b, as shown in the enlarged view of the broken line-section of FIG. 11B.

As shown in FIG. 9, the female coupling bodies 20C-1 and 20C-2 are connected in the coupling/uncoupling mechanism 10C so as to be substantially linearly symmetrical with respect to the fastening wire 254 (fastening member or lever-fixing member). Also, the male coupling bodies 30C and 30C inserted in the insertion space S0 of the female coupling bodies 20C-1 and 20C-2 (see FIG. 10B and FIG. 11B) are in the positional relation, in which the respective leading ends thereof are opposed, as shown in FIG. 9. Consequently, in the female coupling body 20C-1 located on the observers' left side in FIG. 9, the inserting direction of the male coupling body 30C would be the direction of arrow D5, which is directed to the observers' right direction in FIG. 9, and the withdrawing direction would be the direction of arrow D6, which is directed to the observers' left direction in FIG. 9. On the other hand, in the female coupling body 20C-2 on the observers' right side in FIG. 9, the inserting direction of the male coupling body 30C would be the direction of arrow D6, which is directed to the observers' left direction in FIG. 9, and the withdrawing direction would be the direction of arrow D5, which is directed to the observers' right direction in FIG. 9.

In the female coupling body 20C-1, the lever support-coupling section 261, the lever rotation-coupling section 262 and the link rotation-coupling section 263 are arranged in a positional relation to be along the inserting direction D1, as shown in FIG. 10A and FIG. 10B, unlike as the female coupling body 20A of the aforementioned Embodiment 1 or unlike as the female coupling body 20B of the aforementioned Embodiment 2. Also, the link support-coupling section 264 is provided in a position where the support side section 21b is connected to the support front section 21a, instead of the position of the central section of the support side section 21b. While this configuration is similar to the aforementioned Embodiment 1 or 2 in one aspect, in which the insertion space S0 is positioned among the lever support-coupling section 261, the lever rotation-coupling section 262 and the link rotation-coupling section 263 and the link support-coupling section 264 as shown in FIG. 10B, this configuration also provides that the former three of the above-described four coupling sections are arranged along the inserting direction D1, such that the dimension in the width direction of the female coupling body 20C-1 can be reduced.

More specifically, while the female coupling body 20C-1 has a sufficient size for retaining the male coupling body 30C (coupling body-main frame 31), a certain extent of which is inserted therein, the dimension (width) in the direction to intersect with the inserting direction D1 can be reduced by arranging the coupling sections for creating the rotation of the engaging member 23 and the link member 24, namely the lever support-coupling section 261, the lever rotation-coupling section 262 and the link rotation-coupling section 263, along the insertion space S0 (along the inserted coupling body-main frame 31). On the other hand, the length in the inserting direction D1 depends upon the inserted length of the coupling body-main frame 31, and thus would not be considerably changed even though the position of the coupling section is changed. Hence, it is possible to reduce the dimension of the whole female coupling body 20C-1.

Figure 7B:
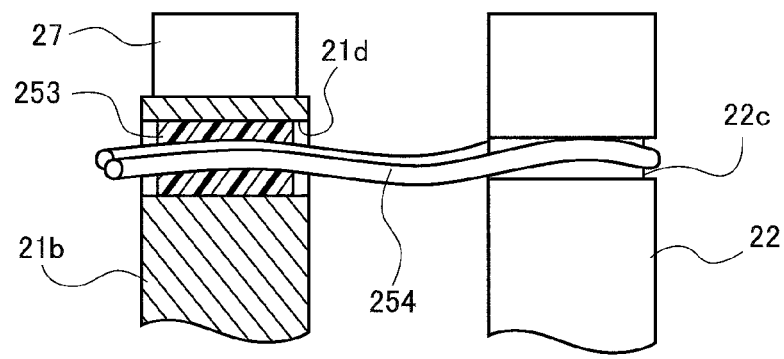
Figure 7C:
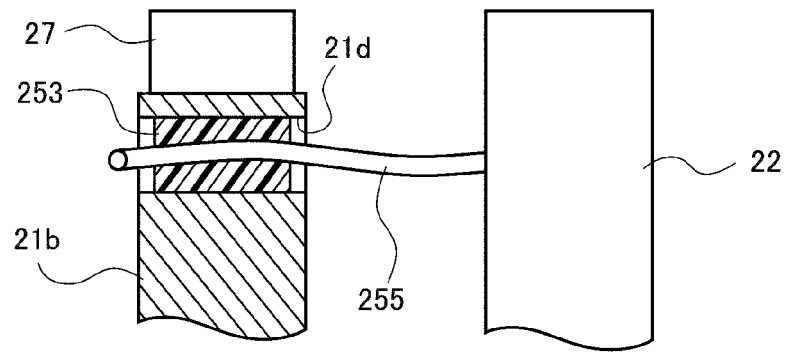
Figure 11A:
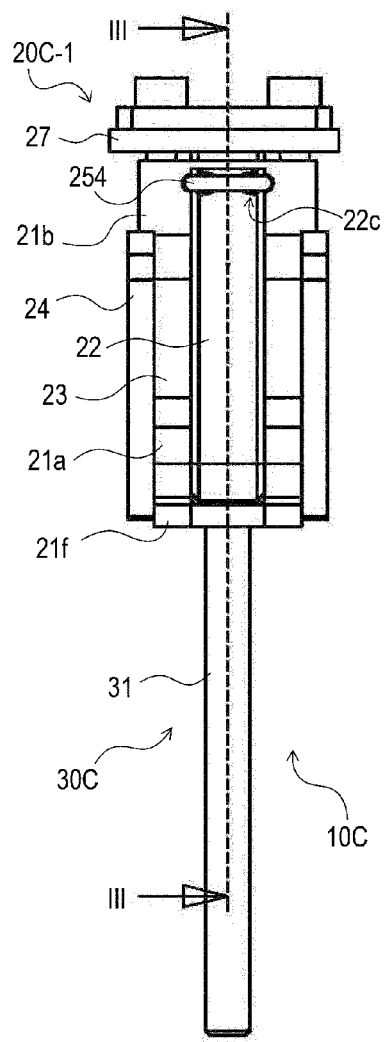
FIG. 11A is a side view from a lever member of the coupling/uncoupling mechanism shown in FIG. 10A.
Figure 11B:
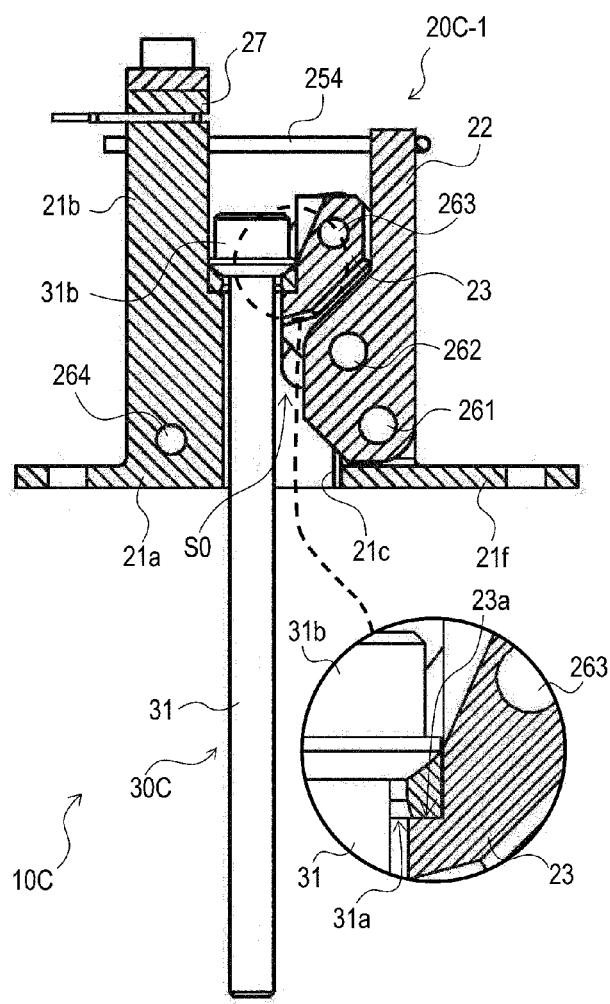
FIG. 11B is a cross-sectional view of an example of an interior configuration of the coupling/uncoupling mechanism shown in FIG. 10A together with showing an enlarged view.

Also, in the female coupling body 20C-1, a fastening wire 254 exemplified in the aforementioned Embodiment 2 is employed as the fastening member (lever-fixing member) for fastening the support side section 21b with the lever member 22 (see FIG. 7B). This fastening wire 254 is turned around by creating a loop as shown in FIG. 11A, and is fixed to the support side section 21b via the fastening member-fixing material 253 as shown in FIG. 10B. (for the purpose of the convenience in the description, the fastening member-insertion hole 21d is not shown in FIG. 10B.)

Here, as shown in FIG. 9, the lever members 22 of the respective female coupling bodies 20C-1 and 20C-2 are fixed to the fastening member-supporting section 28 via a single fastening wire 254. The fastening member-supporting section 28 is provided in the position along the extended support side section 21b, viewed from the respective female coupling bodies 20C-1 and 20C-2, and therefore would be present in the position facing the lever members 22 and 22 of the respective female coupling bodies 20C-1 and 20C-2. A fastening member-insertion hole 28a is provided in this fastening member-supporting section 28, in which both ends of the fastening wire 254 are inserted to be fixed with the fastening member-fixing material 253.

Also, a single fastening wire 254 is fixed to the fastening member-supporting section 28 (more specifically, the support member 21 of the respective female coupling bodies 20C-1 and 20C-2) in the state that the other ends of two lever members 22 and 22 are bundled. In the configuration shown in FIG. 9, the other end of the lever member 22-1 on the observers' left side in FIG. 9 is positioned in the side that is closer to the fastening member-supporting section 28 (inside), and the other end of the lever member 22-2 on the observers' right side in FIG. 9 is positioned outside, and these other ends are overlapped in these states. Since the loop section of the fastening wire 254 is wound on the outer circumference of this overlapped section, two lever members 22 and 22 can be collectively fixed with the single fastening wire 254. Also, the insertion hole-heating unit 27 is provided in the side (outside) opposite to the side facing the lever members 22 and 22 (inside) in the fastening member-supporting section 28.

Then, as described above, once the fastening member-fixing material 253 is softened or melted by the heating with the insertion hole-heating unit 27, the fastening wire 254 is detached from the fastening member-supporting section 28 to open the respective lever members 22 and 22, such that the male coupling bodies 30C and 30C are withdrawn from the respective female coupling body 20C-1 and 20C-2. This allows the band ends of the band member 42 coupled to each other (not shown in FIG. 9) being separated, and thus the state of the Marman clamp band 41 is transitioned from the ring-closed state to the ring-opened state. This achieves the state, in which the artificial satellite 52 is ready for being separated from the rocket main frame 51.

As described above, in the present embodiment, the coupling/uncoupling mechanism 10C is composed of two female coupling bodies 20C-1 and 20C-2 and two male coupling bodies 30C and 30C, and the band member 42 of the Marman clamp band 41 is directly coupled. Hence, the coupling/uncoupling mechanism according to the present invention may employ a complex set of configurations composed of a combination of a plurality of the coupling/uncoupling mechanisms according to Embodiment 1.

In addition to above, FIG. 10A, FIG. 10B and FIG. 11A, FIG. 11B represent the configuration that can be employed alone for the purpose of the convenience in the description, as described above. Hence, for example, a plate-like mounting frame 21f protruded to both outside of the support front section 21a of the female coupling body 20C-1 is provided. This mounting frame 21f is provided to be integral with the support member 21 as shown in the cross-sectional view of FIG. 11B. When such a mounting frame 21f is provided, the female coupling body 20C-1 can be easily fixed in the case of the single use. As described above, according to the actual use conditions, the operating environment, the configuration of the couple-able member, which is the installation object (couple-able section) and the like, various types of modulating configurations such as the mounting frame 21f may be additionally introduced in the support member 21 of the female coupling body 20C-1 or a portion of the male coupling body 30C.

Those having ordinary skills in the art will recognize that the present invention is not limited to the descriptions of the aforementioned Embodiments, and various types of modifications may be made thereto without departing from the spirit and scope of the present invention as set forth in the following claims, and further, implementations obtained by suitably combining technical aspects disclosed in different embodiments or a plurality of modified Embodiments are included in the spirit and scope of the present invention.

In addition, many improvements and other embodiments of the present invention are apparent for those having ordinary skills in the art based on the above-described descriptions. Therefore, the above-described description should be construed as illustrations only, and to be presented for the purpose of teaching the best mode for conducting the present invention by a person having ordinary skills in the art. Therefore, details of the structures and/or functions may be substantially modified without departing from the spirit and scope of the present invention.

INDUSTRIAL APPLICABILITY

The present invention is widely applicable to applications for mutually coupling and uncoupling two couple-able sections. Moreover, according to the present invention, sufficient fastening force can be achieved with a simple configuration and the coupling status can be retained with a smaller force as compared with such a fastening force, and further, a recombination can be easily achieved even after a separation is made, and therefore the present invention can be preferably applicable to, for example, the fields of the cosmonautic vehicles.

REFERENCE SIGNS LIST 10A, 10B, 10C coupling/uncoupling mechanisms
11 band member (couple-able member)
11a one end of band member (couple-able section)
11b other end of band member (couple-able section)
20A, 20B, 20C, 20D female coupling bodies
21 support member
21a support front section
21b support side section
21d fastening member-insertion hole (insertion hole)
22 lever member
22b fastening member-insertion hole (insertion hole)
23 engaging member
23a engaging surface
24 link member
27 insertion hole-heating unit
28a fastening member-insertion hole (insertion hole)
30A, 30C, 30D male coupling bodies
31 coupling body-main frame (male coupling body)
31a engageable surface
41 Marman clamp band
42 band member
51 rocket main frame (cosmonautic vehicle)
52 artificial satellite (cosmonautic vehicle)
131 plate-like member (couple-able section)
141 first lever (couple-able section)
142 second lever (couple-able section)
251 fixing pin member (lever-fixing member, pin member)
252 fastening pin member (lever-fixing member, fastening member, pin member)
253 fastening member-fixing material (thermoplastic material)
254 fastening wire (lever-fixing member, fastening member, string-type member)
261 lever support-coupling section (first supporting point section)
262 lever rotation-coupling section (second supporting point section)
263 link rotation-coupling section (third supporting point section)
264 link support-coupling section (fourth supporting point section)
S0 insertion space

The invention claimed is:

1. A coupling/uncoupling mechanism, employed for coupling and uncoupling two couple-able sections to and from each other, comprising a bar-shaped male coupling body and a female coupling body having an insertion space for inserting and withdrawing the male coupling body,
wherein said male coupling body has an engageable surface, which intersects a lengthwise direction thereof and faces a withdrawing direction,
wherein said female coupling body comprises:
a support member having a shape including the insertion space for supporting a state in which said male coupling body is inserted in said insertion space;
a lever member, provided in a position facing said insertion space, and having one end and the other end, said one end being connected to said support member by a lever support-coupling section, said other end being configured to be movable in a direction toward a side opposing to said insertion space by the lever support-coupling section;
an engaging member, rotatably connected at one end thereof to a position between both ends of said lever member via a lever rotation-coupling section, and having an engaging surface, which is contacted with said engageable surface of said male coupling body from the withdrawing direction; and
a link member, rotatably connected at one end thereof to the other end of said engaging member via a link rotation-coupling section positioned away from said lever rotation-coupling section and in proximity to said engaging surface, in an inserting direction, and rotatably connected at the other end thereof to said support member via a link support-coupling section,
wherein, when said male coupling body is coupled to said female coupling body, said male coupling body is inserted in the insertion space, the other end of said lever member is disposed in a position in proximity to said insertion space, and a condition in which said engaging surface of said engaging member is contacted with said engageable surface of said male coupling body is maintained, and
wherein, when said male coupling body and said female coupling body are uncoupled, the other end of said lever member moves along a direction of being apart from said insertion space so that said engaging surface of said engaging member moves toward a withdrawing direction, resulting in releasing the contacting between said engaging surface and said engageable surface of said male coupling body.

2. The coupling/uncoupling mechanism according to claim 1,
wherein, when said male coupling body is coupled to said female coupling body,
said lever support-coupling section and said link rotation-coupling section are arranged in this sequence along a direction from said lever member toward said insertion space;
said lever rotation-coupling section is disposed in the withdrawing direction with respect to said link rotation-coupling section, and
said link support-coupling section is positioned such that said insertion space is interposed between said link rotation-coupling section and said link support-coupling section.

3. The coupling/uncoupling mechanism according to claim 1,
further comprising a lever-fixing member for releasably fixing the lever member to said support member so as to disturb a movement of the other end of said lever member.

4. The coupling/uncoupling mechanism according to claim 3,
wherein said support member includes a support front section, which constitutes a front section of said female coupling body and has an opening for inserting and withdrawing said male coupling body in and from said insertion space, and a support side section, which constitutes a section facing said lever member, and
wherein said lever-fixing member is a pin member or a string-type member for connecting an end section of said support side section in the side of the inserting direction to the other end of said lever member.

5. The coupling/uncoupling mechanism according to claim 4,
wherein an insertion hole for inserting one end of said pin member or said string-type member is provided in said end section of said support side section or in the other end of said lever member, and an insertion hole-heating unit provided in a position adjacent to the insertion hole and for heating the interior of the insertion hole is further provided, and
wherein, when said male coupling body is coupled to the female coupling body, said end section of said support side section is connected to the other end of said lever member by blocking the insertion hole with a thermoplastic material, after one end of said pin member or string-type member is inserted in said insertion hole.

6. The coupling/uncoupling mechanism according to claim 1,
wherein said male coupling body and said female coupling body are configured to be coupled or uncoupled for opening or closing a ring of a strip-shaped band member.

7. The coupling/uncoupling mechanism according to claim 1,
wherein said male coupling body and said female coupling body are configured to be coupled to respective end sections of a band member of a Marman clamp band for fixing a second cosmonautic vehicle to a first cosmonautic vehicle.

8. A cosmonautic vehicle, comprising the coupling/uncoupling mechanism according to claim 7.

9. The coupling/uncoupling mechanism according to claim 1,
wherein said male coupling body and said female coupling body are configured to be coupled to respective end sections of a band member of a Marman clamp for fixing to a rocket main frame to an artificial satellite.

10. A coupling/uncoupling mechanism, employed for coupling and uncoupling two couple-able sections to and from each other, comprising a bar-shaped male coupling body and a female coupling body having an insertion space for inserting and withdrawing the male coupling body,
wherein said female coupling body comprises:
a support member having a support side section, which is in parallel with the insertion space so as to support a state in which said male coupling body is inserted in said insertion space;
a lever member, provided in a position facing said support side section to form said insertion space interposed therebetween, and having one end and the other end, said one end being rotatably connected to said support member by a lever support-coupling section, said other end being configured to be movable in a direction toward a side opposing to said insertion space by the lever support-coupling section; and
a lever-fixing member for connecting the other end of the lever member to an end section of said support side section for providing fixing so as to prevent the other end of said lever member from being moved to the outside,
wherein an insertion hole for inserting one end of said lever-fixing member is further provided in said end section of said support side section or the other end of said lever member, and an insertion hole-heating unit disposed in a position adjacent to the insertion hole, for heating the interior of the insertion hole, is further provided, and
wherein, when said male coupling body is coupled to the female coupling body, the end section of said support side section is connected to the other end of said lever member by blocking the insertion hole with a thermoplastic material, after one end of said lever-fixing member is inserted in said insertion hole.

11. The coupling/uncoupling mechanism according to claim 10,
wherein said lever-fixing member has a main frame, which is bar-shaped or string-shaped, and
wherein, when said male coupling body is coupled to the female coupling body, the other end of said lever-fixing member is mechanically fixed to one without being provided with said insertion hole selected from said support side section and the other end of said lever member.

12. The coupling/uncoupling mechanism according to claim 10,
wherein said male coupling body and said female coupling body are configured to be coupled or uncoupled for opening or closing a ring of a strip-shaped band member.

13. The coupling/uncoupling mechanism according to claim 10,
wherein said male coupling body and said female coupling body are configured to be coupled or uncoupled for opening or closing a ring of a strip-shaped band member of a Marman clamp band for fixing a second cosmonautic vehicle to a first cosmonautic vehicle.

14. A cosmonautic vehicle, comprising the coupling/uncoupling mechanism according to claim 13.

15. The coupling/uncoupling mechanism according to claim 10,
wherein said male coupling body and said female coupling body are configured to be coupled or uncoupled for opening or closing a ring of a strip-shaped band member of a Marman clamp for fixing a rocket main frame to and artificial satellite.

* * * * *